US008415561B2

(12) United States Patent
Gates et al.

(10) Patent No.: US 8,415,561 B2
(45) Date of Patent: Apr. 9, 2013

(54) ELECTRICAL ENCLOSURE

(75) Inventors: Doug Gates, Edina, MN (US); Steve Carle, Edina, MN (US)

(73) Assignee: Advanced Currents Corp., Edina, MN (US)

( * ) Notice: Subject to any disclaimer, the term of this patent is extended or adjusted under 35 U.S.C. 154(b) by 389 days.

(21) Appl. No.: 12/752,661

(22) Filed: Apr. 1, 2010

(65) Prior Publication Data

US 2010/0186982 A1 Jul. 29, 2010

Related U.S. Application Data

(60) Continuation-in-part of application No. 12/210,718, filed on Sep. 15, 2008, now Pat. No. 7,705,239, which is a division of application No. 11/485,224, filed on Jul. 12, 2006, now Pat. No. 7,425,677.

(51) Int. Cl.
*H02G 3/08* (2006.01)

(52) U.S. Cl. .............. 174/50; 174/481; 174/53; 174/59; 220/3.2; 220/3.3; 439/535

(58) Field of Classification Search .................. 174/480, 174/481, 50, 53, 57, 58, 66, 59, 67, 51; 220/3.2–3.9, 220/4.02, 241, 242; 439/535, 536, 596, 467; 361/600, 601; 248/906; D13/152
See application file for complete search history.

(56) References Cited

U.S. PATENT DOCUMENTS 1,938,309 A 12/1933 Williams
2,433,917 A 1/1948 McCartney
2,908,743 A 10/1959 Premoshis
3,609,647 A 9/1971 Castellano
3,635,305 A 1/1972 Kunishi et al.
3,814,834 A 6/1974 Glader
4,050,770 A 9/1977 Rigo
4,165,443 A 8/1979 Figart et al.
4,273,957 A 6/1981 Kolling
4,500,746 A 2/1985 Meehan
4,842,551 A 6/1989 Heimann
4,918,258 A 4/1990 Ayer
4,924,032 A 5/1990 Akins
4,976,631 A 12/1990 Harlow
5,015,203 A 5/1991 Furrow
5,380,951 A 1/1995 Comerci et al.
5,471,012 A 11/1995 Opel
5,525,754 A 6/1996 Akins
5,785,551 A 7/1998 Libby
5,925,850 A 7/1999 Park
(Continued)

*Primary Examiner* — Angel R Estrada
(74) *Attorney, Agent, or Firm* — Dicke, Billig & Czaja, PLLC

(57) ABSTRACT

An electrical enclosure includes a first part and a second part together forming a body. The body has an inner surface and an outer surface that are separated on opposing surfaces of the body. An outer junction is adjacent the outer surface of the body and an inner junction adjacent the inner surface of the body. Conductive pass-throughs that are at least partially contained within the body electrically couple the inner and outer junctions. An external conductor routing high-voltage from a high-voltage source in the building structure is coupled to the outer junction and mechanically fixed thereto, enclosed by a cover engaging the outer surface sufficiently to provide fire protection and prevent degradation, and such that no portion of the external conductor passes through the body into the inner surface. The second part is removable through the first part thereby providing access to the outer junction through the first part.

18 Claims, 16 Drawing Sheets

U.S. PATENT DOCUMENTS

| | | | | |
|---|---|---|---|---|
| 5,934,935 | A | 8/1999 | Kameyama | |
| 5,975,938 | A | 11/1999 | Libby | |
| 6,045,374 | A | 4/2000 | Candeloro | |
| 6,099,348 | A | 8/2000 | Horton | |
| 6,156,971 | A | 12/2000 | May | |
| 6,201,187 | B1 | 3/2001 | Burbine | |
| 6,239,365 | B1 | 5/2001 | McEvers | |
| 6,376,580 | B1 | 4/2002 | Ikuta et al. | |
| 6,376,770 | B1 | 4/2002 | Hyde | |
| 6,425,773 | B2 | 7/2002 | Mosebach et al. | |
| 6,514,652 | B2 | 2/2003 | Cash | |
| 6,544,049 | B1 | 4/2003 | Pierson | |
| 6,558,190 | B1 | 5/2003 | Pierson | |
| 6,617,511 | B2 | 9/2003 | Schultz et al. | |
| 6,644,987 | B2 | 11/2003 | Maleck | |
| 6,740,810 | B1 | 5/2004 | Regueiro | |
| 6,786,766 | B1 | 9/2004 | Chopra | |
| 6,937,461 | B1 | 8/2005 | Donahue | |
| 6,945,815 | B1 | 9/2005 | Mullally | |
| 7,034,222 | B1 | 4/2006 | York | |
| 7,160,147 | B1 | 1/2007 | Stephan | |
| 7,425,677 | B2 * | 9/2008 | Gates et al. | 174/50 |
| 7,705,239 | B2 * | 4/2010 | Gates et al. | 174/50 |

* cited by examiner

ELECTRICAL ENCLOSURE

CROSS-REFERENCE TO RELATED APPLICATIONS

This patent application is a Continuation-in-Part of co-pending U.S. patent application Ser. No. 12/210,718, filed Sep. 15, 2008, which is a Divisional of U.S. patent application Ser. No. 11/485,224, filed Jul. 12, 2006, now U.S. Pat. No. 7,425,677, all of which are incorporated herein by reference.

BACKGROUND

The present invention relates to an electrical enclosure. Electrical circuitry installation associated with building construction typically involves routing wires from a circuit breaker panel to individual junction boxes dispersed throughout the building. Typically, wires are also routed between individual junction boxes. These junction boxes will eventually hold junction devices such as switches and receptacles. These switches and receptacles are coupled to the conductors or wires that are circulated from other junction boxes or from the circuit breaker panel.

Routing conductors or wires from the circuit breaker panel to the individual junction boxes typically requires removing insulation from each of the individual wires, threading these wires through the openings created in the junction boxes, and then coupling these wires to the various switches and receptacles. This process typically involves considerable labor time, and thus expense. For these and other reasons, there is a need for the present invention.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
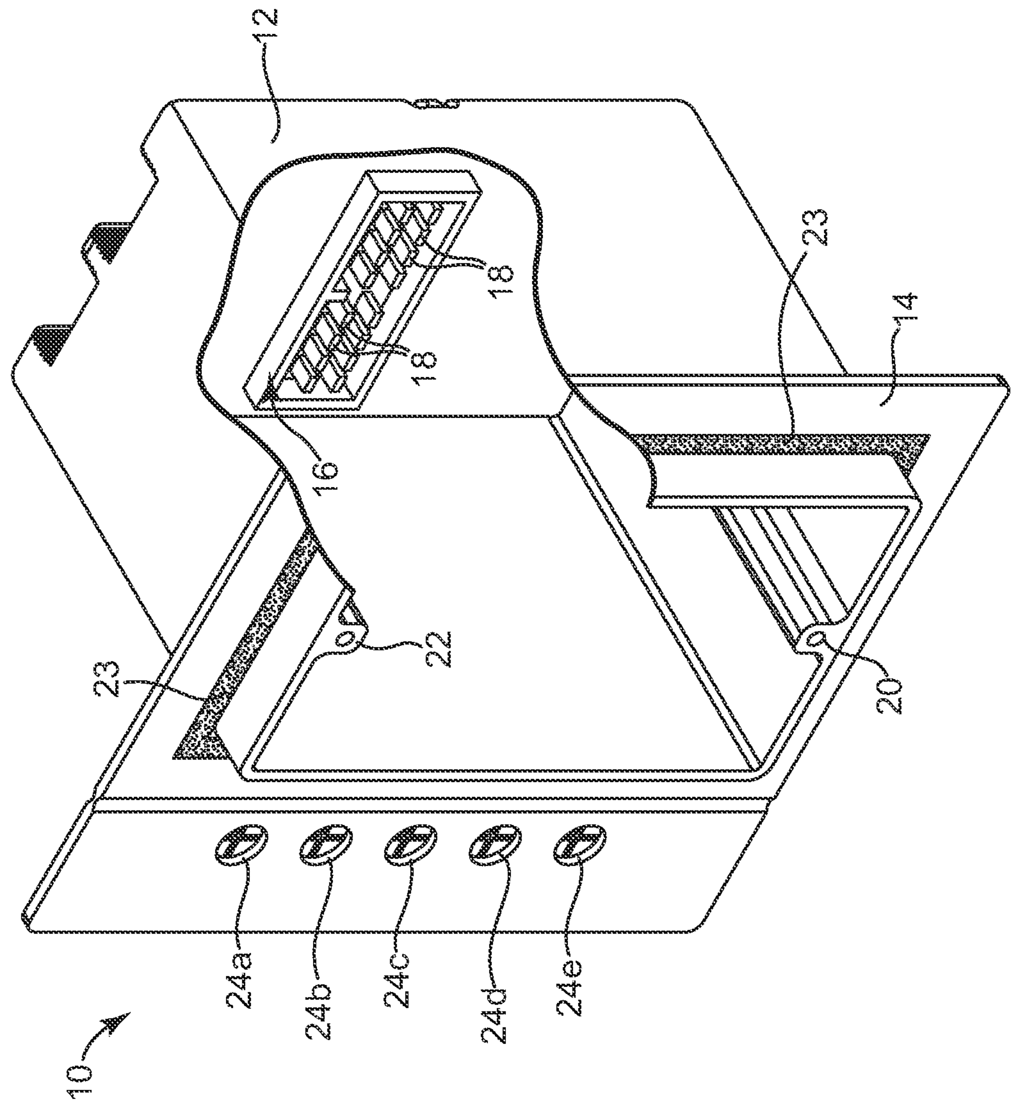
FIG. 1 illustrates a front perspective view of an electrical enclosure in accordance with one embodiment of the present invention.

FIG. 1 illustrates electrical enclosure 10 in accordance with one embodiment of the present invention. In one embodiment, electrical enclosure 10 is configured to be connectable within a wall, ceiling, or floor of a building structure. Electrical conductors or wiring may then be routed from a circuit breaker panel within the building structure to electrical enclosure 10, which in one case is configured as a junction box. In one case, the circuit breaker panel is configured to distribute high-voltage to the various junction boxes, such as 120-240 volts. In other cases, high-voltage can be various levels above 50 volts. Various junction devices, such as receptacle outlets, switched receptacles, light switches, dimmer switches, fans, lights, fixtures and electrical appliances, can be connected to electrical enclosure 10 and are thereby coupled to the wires from the circuit breaker panel delivering the high voltage.

In one embodiment, electrical enclosure 10 includes body 12 and face 14. In one embodiment, body 12 and face 14 are an integrated single piece. In one case, body 12 includes first and second connection points 20 and 22 into which various junction devices can be mechanically secured. For example, a variety of switches and receptacles may be configured to screw into first and second connection points 20 and 22 thereby securing such junction devices to body 12 of electrical enclosure 10. In alternative embodiments, first and second connection points 20 and 22 can be configured to accept junction devices with a friction fit. For example, first and second connection points 20 and 22 can be configured as a series of angled steps into which extending portions of junction devices extend, thereby creating a friction fit between them. One skilled in the art will understand that there are a variety of means for attaching junction devices to electrical enclosure 10 in accordance with the present invention.

In one embodiment, face 14 is configured with punch-outs 24*a*-24*e*. Such punch-outs 24*a*-24*e* may be used to permanently or temporarily secure electrical enclosure 10 to a location in the building structure wall or ceiling. In some cases, electrical enclosure 10 may be secured to such wall or ceiling by securing a nail or screw through one or more punch-outs 24*a*-24*e*. If electrical enclosure 10 is accidentally secured to an incorrect location, it can be removed and alternative punch-outs 24*a*-24*e* can be used to secure electrical enclosure 10 to an alternative location. In another case, electrical enclosure 10 may be temporarily secured to such wall, floor or ceiling while electrical wires are routed from the circuit breaker panel to the various electrical enclosures 10, while walls, floors, and/or ceilings are still being finished.

Electrical enclosure 10 also includes an inner junction 16 on an inner side of electrical enclosure 10, as well as an outer junction 30 (illustrated in FIG. 2) on an outer side of electrical enclosure 10. In one embodiment of the invention, electrical conductors or wiring from the circuit breaker panel of the building is brought to the outer junction 30 on the outer side of electrical enclosure 10 and secured thereto. Electrical junction devices such as switches and receptacles are then electrically coupled to inner junction 16 on the inner side of electrical enclosure 10.

In one embodiment, an electrical connection between inner junction 16 and outer junction 30 is provided within body 12 of electrical enclosure 10 such that no hole or breakout is required in body 12 to complete the electrical connection between inner and outer junctions 16 and 30. In one embodiment, pass-throughs 50 (illustrated in FIG. 3 and discussed more fully below) are at least partially contained within body 12 of electrical enclosure 10 to complete the electrical connection between inner and outer junctions 16 and 30. In one case, pass-through 50 is a metallic connector. In this way, electrical enclosure 10 provides a closed barrier to air and water vapor between its inner and outer sides. For example, in one case body 12 can be injection molded plastic that is molded in such a way as to partially encapsulate pass-through 50. A plurality of internally exposed portions 18 of a plurality of pass-throughs 50 or electrical connections, which are at least partially contained within body 12, are illustrated at inner junction 16 in FIG. 1.

In one embodiment, adhesive material 23 is included on face 14 of electrical enclosure 10. In one case, the adhesive material 23 is provided on the inner side of electrical enclosure 10. Adhesive material 23 is illustrated a narrow strip in FIG. 1. In alternative embodiments, however, it may be wider to extend to the remaining portions of face 14 of enclosure 10. After electrical enclosure 10 is installed, a protective layer included over the adhesive material 23 can be removed thereby exposing an adhesive surface. In this way, polyethylene sheets, insulating material or other barrier material that is typically used to cover a wall, floor, or ceiling of a building structure can be connected directly to the inner side electrical enclosure 10 via adhesive strip 23. Since there is no break or opening between the outer and inner sides of electrical enclosure 10, a barrier is preserved even after wire from a circuit breaker panel is connected at outer junction 30 and a junction device is coupled to inner junction 16.

As such, once electrical enclosure 10 is installed in a wall, floor, or ceiling, it forms part of a plane that separates its front or inner side from its back or outer side. Electrical conductors or wiring from the circuit breaker panel of the building are brought to the outer junction 30 on its back or outer side and electrical junction devices such as switches and receptacles are electrically coupled to inner junction 16 on its front or inner side. The electrical connection between the front and back sides are accomplished with pass-throughs 50 without any opening or break between the inner and outer sides of electrical enclosure 10 by partially embedding pass-throughs 50 in body 12 of electrical enclosure 10.

Figure 2:
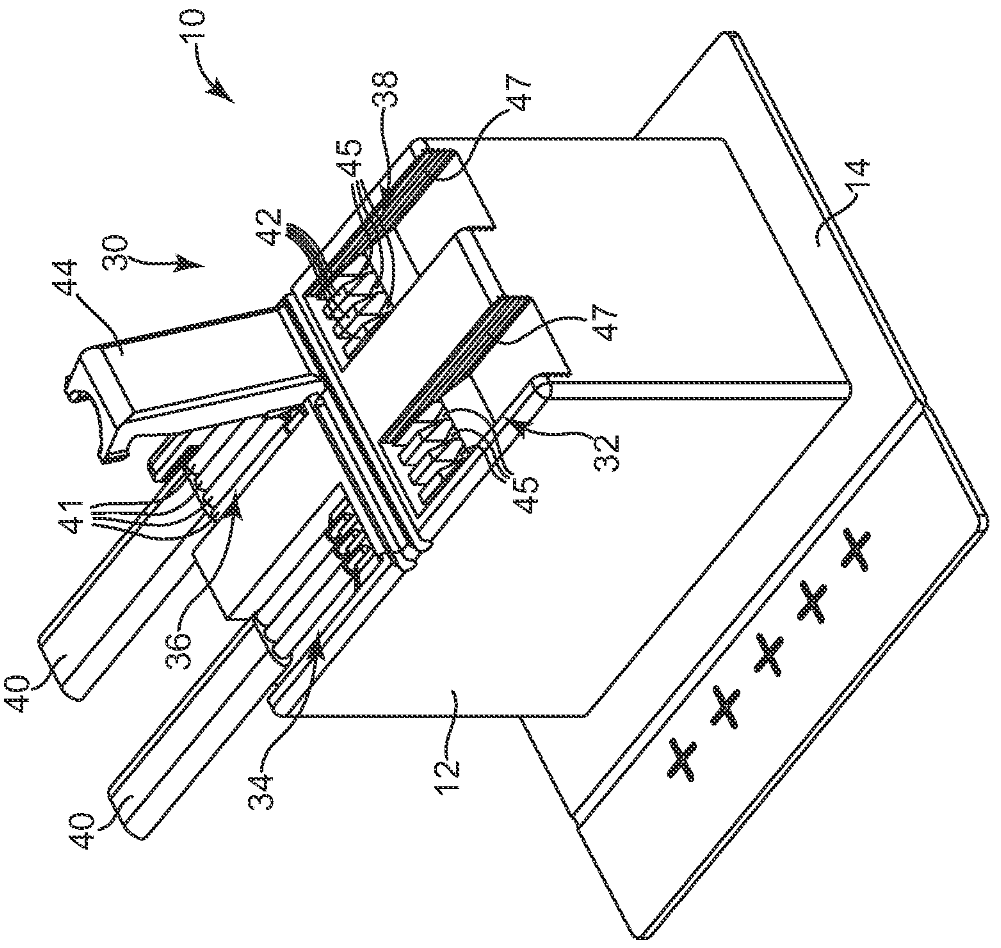
FIG. 2 illustrates a rear perspective view of an electrical enclosure in accordance with one embodiment of the present invention.

FIG. 2 illustrates a rear perspective view of electrical enclosure 10 in accordance with one embodiment of the present invention. Outer junction 30 is illustrated on a back side of electrical enclosure 10. In one embodiment, outer junction 30 includes first, second, third, and fourth outer ports 32, 34, 36, and 38. Electrical conductors or wiring from a building circuit breaker panel or from another electrical box can be brought to and connected at any of or each of first through fourth ports 32-38. These electrical connections or ports are then electrically coupled to inner junction 16 via pass-through 50, as will be discussed more fully below.

In one embodiment, each of first through fourth outer ports 32-38 is configured to receive electrical conductor 40. For example, in FIG. 2 electrical conductor 40 is illustrated coupled to second and third outer ports 34 and 36. First and fourth outer ports 32 and 38 have been left open for illustration purposes, but these are also configured to receive electrical conductor 40. Each of first through fourth outer ports 32-38 may be configured to receive individual wires 41 from within electrical conductor 40.

For example, fourth outer port 38 is illustrated with guides 42, which define individual slots 45 therebetween. Each of the slots 45 between guides 42 is configured to receive individual wires 41 from electrical conductor 40. For example, electrical conductor 40 may be a nonmetallic-sheathed cable, such as a Romex cable, with three or four individual wires 41 within the sheath. Typically, nonmetallic-sheathed cable will carry a “hot” wire, a “neutral” wire, and a “ground” wire. In some cases, a fourth wire carrying a “second hot” wire is also included in the nonmetallic-sheathed cable. Like fourth outer port 38 illustrated with guides 42 defining four slots 45, each of the other outer ports 32, 34 and 36 are similarly configured with guides and slots for guiding and receiving multiple-wire electrical conductor 40.

Each of outer ports 32, 34, 36 and 38 can be alternatively configured to accept and guide multiple-wire electrical conductor 40 consistent with the present invention. For example, individual collars can be provided within each of outer ports 32, 34, 36 and 38 that are configured to receive and guide individual wires 41. They can also funnel the individual wires 41 to an appropriate location so that they are electrically coupled to inner junction 16 via pass-through 50, as will be discussed more fully below.

Each of first through fourth outer ports 32-38 may also be configured with wire cover 44. In one embodiment, wire cover 44 is hinged at one end on the outer surface of body 12. As such, cover 44 may be moved away from the outer surface to accommodate bringing electrical conductor 40 into each of the outer ports 32-38. Once electrical conductor 40 is in place within any one of outer ports 32-38, cover 44 may be hinged back toward the outer surface of body 12 and snapped or otherwise secured firmly to the outer surface of body 12, as will be discussed more fully below. Wire covers 44 may be configured to be removable, and for illustration purposes, cover 44 is illustrated only on third outer port 36. In one embodiment, all outer ports 32-38 are provided with wire covers 44.

Wire covers 44 can be configured in a variety of ways consistent with the present invention. For example, wire covers 44 can be hinged or otherwise removably attached to body 12 in a variety of ways. In one embodiment, wire covers 44 push wires 41 into contact with pass-through 50 and helps maintain a force that will keep them in contact. In another embodiment, wire cover 44 secures electrical conductor 40 to body 12, thereby providing additional strain relief to the electrical connection. In another embodiment, wire covers 44 provide fire protection in the event an electrical connection fails and heat build-up ensues. For example, cover 44 can be sufficient to meet applicable fire retardant standards, providing seals along the walls of the cover and body 12.

Figure 3:
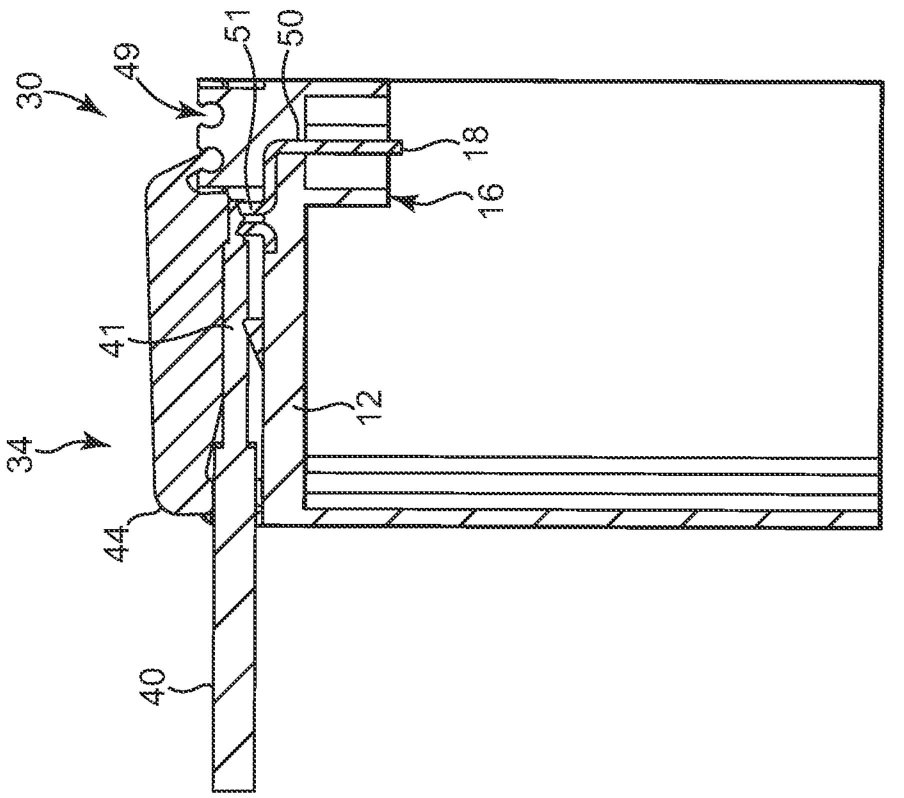
FIG. 3 illustrates a cross-sectional view of a portion of an electrical enclosure in accordance with one embodiment of the present invention.

FIG. 3 illustrates a partial cross-sectional view of a portion of electrical enclosure 10 in accordance with one embodiment of the present invention. Second outer port 34 and a portion of first outer port 32 are illustrated toward the top of the figure, and inner junction 16 is illustrated toward the upper portion of the figure. Pass-through 50 is illustrated partially contained in body 12 of electrical enclosure 10. In one case, pass-through 50 is a metallic connector or wire. Pass-through 50 electrically couples inner junction 16 with outer junction 30. More specifically in the illustration of FIG. 3, pass-through 50 couples a portion of inner junction 16 with second outer port 34. In one embodiment, a plurality of pass-throughs 50 are used to electrically couple individual wires 41 with various connectors that are used to couple electrical devices such as switches and receptacles to inner junction 16.

FIG. 3 also illustrates electrical conductor 40 coupled to second outer port 34. An individual wire 41 is illustrated extending from electrical conductor 40 and is secured and electrically coupled to pass-through 50 at second outer port 34. In the illustration, individual wire 41 is secured against externally exposed portion 51 of pass-through 50. The internally exposed portion 18 of pass-through 50 then extends out adjacent inner junction 16, and is thus available for connection to a switch or receptacle.

Wire cover 44 is illustrated in a closed position further securing conductor 40 against the outer surface of electrical enclosure 10 and providing a barrier over conductor 40. In one embodiment, wire cover 44 is hinged within a slot 49. Slot 49 is also illustrated without a cover 44 at the portion shown in first outer port 32 of FIG. 3. A variety of other means of attaching cover 44 can also be used. For example, the cover 44 can be hinged to enclosure 10 using a variety of hinge technologies; it can be configured to slide relative to enclosure 10; or it can even snap into place and be removed completely. In yet other embodiments, any covers 44 are eliminated.

Figure 4:
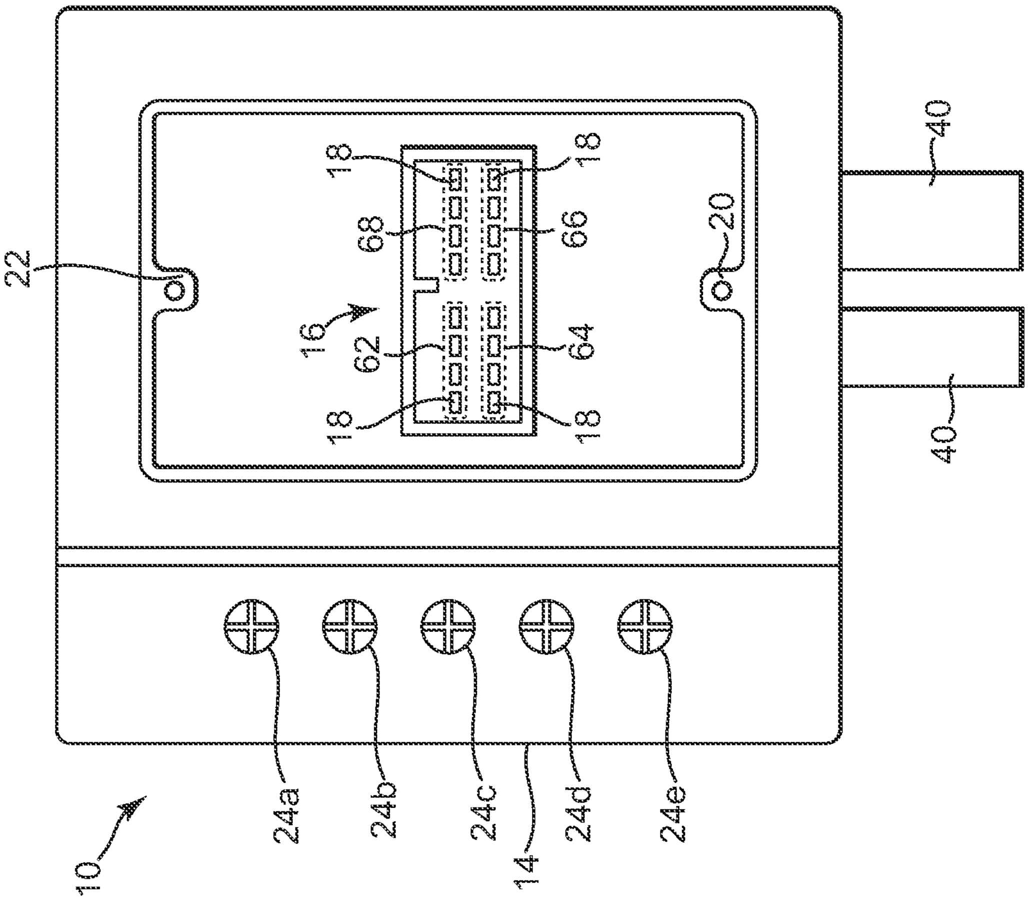
FIG. 4 illustrates a front plan view of an electrical enclosure in accordance with one embodiment of the present invention.

FIG. 4 illustrates a front view of electrical enclosure 10 in accordance with one embodiment of the present invention. Electrical enclosure 10 includes face 14, inner junction 16, first and second connection points 20 and 22, and punch-outs 24*a*-24*e*. Inner junction 16 further includes a connection point to the plurality of pass-throughs 50, and the internally exposed portion 18 for the plurality of pass-throughs 50 are illustrated in inner junction 16.

In one embodiment, there is are a plurality of pass-throughs 50 (FIG. 3) electrically coupling each of first through fourth outer ports 32-38 (FIG. 2) to various sections of inner junction 16 (FIG. 4). For example, in one case, four pass-throughs 50 are connected between first outer port 32 of outer junction 30 and first section 62 (illustrated with dashed lines in FIG. 4) of inner junction 16; four pass-throughs 50 are connected between second outer port 34 of outer junction 30 and second section 64 (illustrated with dashed lines in FIG. 4) of inner junction 16; four pass-throughs 50 are connected between third outer port 36 of outer junction 30 and third section 66 (illustrated with dashed lines in FIG. 4) of inner junction 16; four pass-throughs 50 are connected between fourth outer port 38 of outer junction 30 and fourth section 68 (illustrated with dashed lines in FIG. 4) of inner junction 16. Four internally exposed portions 18 of these four pass-throughs 50 are illustrated within each of first section 62, second section 64, third section 66 and fourth section 68. In each case, the pluralities of pass-throughs 50 are at least partially contained in body 12 of electrical enclosure 10.

In one embodiment, one or more junction devices, such as a receptacle outlet, a switched receptacle, a light switch, a dimmer switch, a fan, a light, a fixture or an electrical appliance, can be mounted to electrical enclosure 10 utilizing first and second connection points 20 and 22. Furthermore, these junction devices can be provided with modular connectors that are configured to plug into inner junction 16. Such a modular device can be configured to accept some or all of the internally exposed portions 18 of pass-throughs 50 within first through fourth sections 62-68. Since internally exposed portions 18 of first through fourth inner sections 62-68 are electrically coupled to first through fourth outer ports 32-38, these junction devices are then electrically coupled to the various electrical conductors 40 that are coupled to outer junction 30 (which then in turn extend to a main circuit breaker panel or other electrical enclosures). This and alternative embodiments will be more fully discussed below.

Because electrical conductor 40 is brought to the outer junction 30 rather than through its body 12 to the inside, significant space is saved within electrical enclosure 10. Prior boxes that required "punch-outs" or other openings that allow electrical conductor 40 to be brought inside the box tend to cause crowding in the box and/or require very deep boxes that may not be accommodated in some environments. Also, by avoiding the large bunches of wire that tend to be crowded into conventional boxes, one embodiment of electrical enclosure 10 avoids risks of bending or potentially breaking conductors or wires that can otherwise occur when wires are forced inside the box. Avoiding crowding decreases the risk of accidental shorting and increases the life of the wire.

Furthermore, crowding within a junction box caused in prior devices also risks electrical connections becoming dislodged. Also, crowding can cause wires to incur sharp bends when being stuffed in, thus risking heat build-up at the bend. This can cause the insulation to degrade and crack over time, leading to potential for arcing and fire. Avoiding crowding within a junction box by attaching to the outer junction rather than inside the box can avoid many of these dangers.

Also, by virtue of the fact that electrical conductor 40 is attached at outer junction 30 on the outer surface of electrical enclosure 10, there is relatively little space restriction. This enables a number of independent electrical conductors 40 to be attached to a single electrical enclosure 10. For example, four outer ports 32-38 are illustrated in FIG. 2, but additional ports could be added as needed. In one example, electrical enclosure 10 could include additional ports, or ports could be added adjacent the outer surfaces of electrical enclosure 10 as well. Of course, fewer ports, or even a single port, can be used.

The various outer ports 32-38 illustrated in the embodiment can also function as "pass-through" connections to other electrical enclosures.

Figure 5:
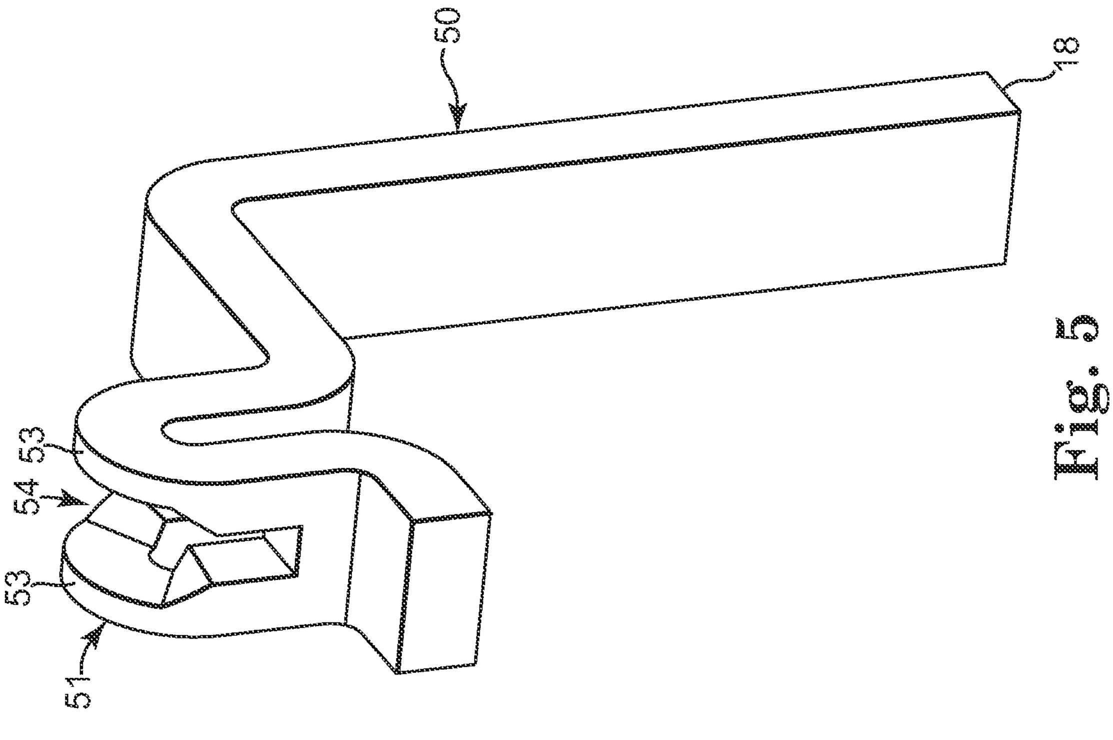
FIG. 5 illustrates an isolation view of a through-wire in accordance with one embodiment of the present invention.

FIG. 5 illustrates an exploded isolation view of a pass-through 50 in accordance with one embodiment of the present invention. Pass-through 50 includes an internally exposed portion 18 and an externally exposed portion 51. As illustrated in FIG. 3 for example, the internally exposed portion 18 of pass-through 50 extends adjacent inner junction 16 and the externally exposed portion 51 of pass-through 50 extends adjacent outer junction 30. The portions of pass-through 50 between internally exposed portion 18 and an externally exposed portion 51 are contained within body 12 of electrical enclosure 10. For example, electrical enclosure 10 can be molded plastic that is molded over pass-through 50, while allowing internally exposed portion 18 to protrude adjacent inner junction 16 and allowing externally exposed portion 51 to protrude adjacent outer junction 30.

In the illustrations of FIGS. 2 and 3, four pass-throughs 50 are illustrated extending between first outer port 32 and first inner section 62, between second outer port 34 and second inner section 64, between third outer port 36 and third inner section 66, and between fourth outer port 38 and fourth inner section 68. Thus, each of the ports can accommodate up to four-wire applications. Obviously, additional pass-throughs 50 can be added to each of the ports for particular applications, and some could be removed as well.

Also, all of the ports need not be used for any particular application. One or more of the ports can be used. Similarly, in some applications, only some of the pass-throughs 50 may be used in some applications. For example, if only three individual wires 41 are attached to first outer port 32, only the pass-throughs 50 that are electrically coupled to those individual wires 41 will be used in that particular application.

Each of pass-throughs 50 is configured at its externally exposed portion 51 to receive individual wires 41 at outer junction 30. In one embodiment, externally exposed portion 51 includes two symmetrically raised edges 53, which define a slot 54 configured to receive an individual wire 41. For example, an electrical conductor 40 may be nonmetallic-sheathed cable containing three or four individual wires 41. Once the sheath around electrical conductor 40 is removed, the three or four individual wires 41 are exposed. One of these individual wires 41 may be placed in slot 54 defined by edges 53 and secured therein.

Figure 6:
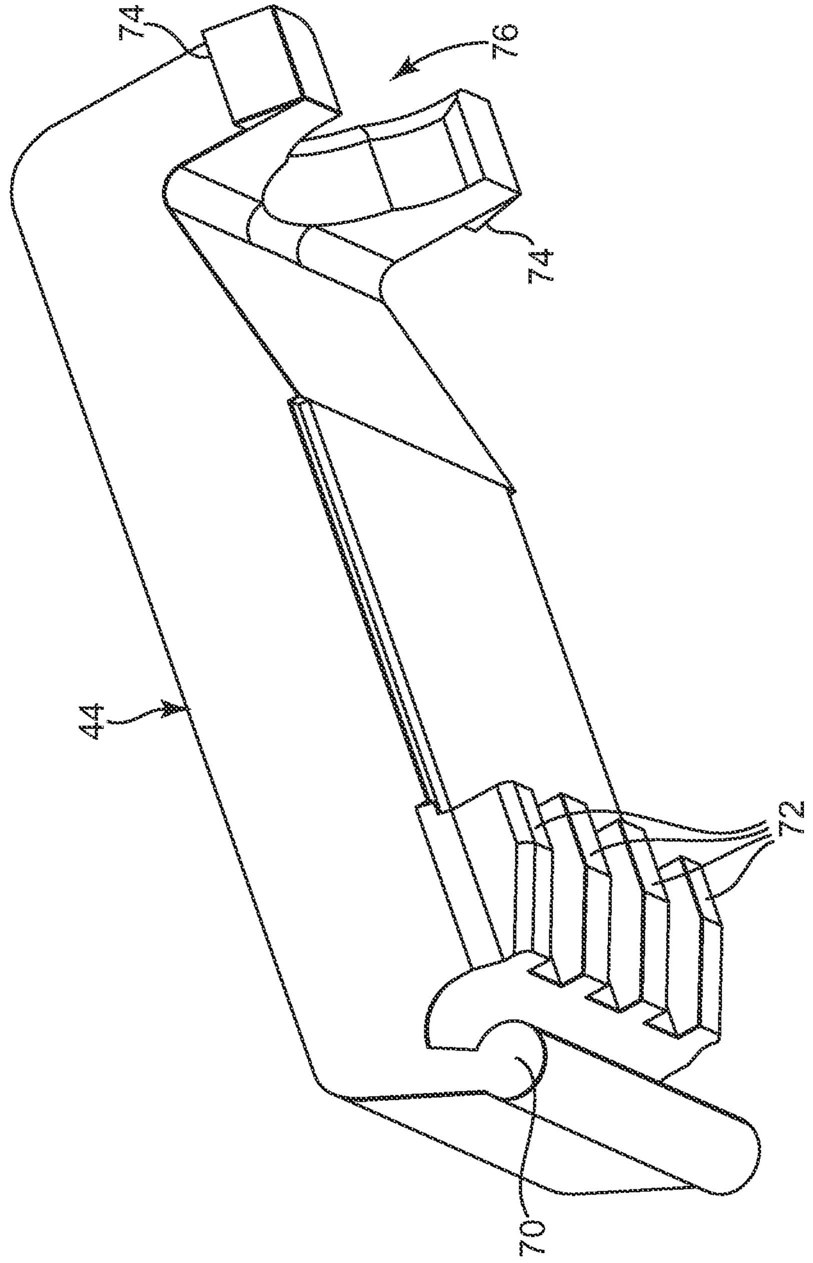
FIG. 6 illustrates an isolation view of a wire cover in accordance with one embodiment of the present invention.

FIG. 6 illustrates an isolation view of cover 44 in accordance with one embodiment of the present invention. In one embodiment, cover 44 includes pivot roll 70, a plurality of ribs 72, snap-down ends 74 and wire opening 76. Pivot roll 70 is configured to fit within slot 49 (illustrated in FIG. 3) so that cover 44 may easily pivot between an open and closed position. A slot 49 such as that illustrated in FIG. 3 can be provided at each of first through fourth outer ports 32-38, so that each outer port 32-38 includes a pivotable cover 44. Pivot roll 70 allows each cover 44 to pivot into an open position, thereby allowing electrical conductor 40 to be coupled to each of the outer ports, and allows each cover 44 to pivot to a closed position thereby securing electrical conductor 40 firmly against electrical enclosure 10.

A variety of other configurations for cover 44 are also possible with the present invention. For example, rather than using a pivot roll 70 and slot 49, cover 44 can be provided with any of a variety of hinge technologies to hinge cover relative to enclosure 10. Alternatively, additional snap-down ends, such as snap-down ends 74 can be provided so that the cover can be snapped into place. Other configurations, such as sliding the cover relative to enclosure 10, as also possible.

In one embodiment and with additional reference to FIG. 5, a plurality of ribs 72 are configured on a bottom side of cover 44 to interact with edges 53 of externally exposed portion 51 of pass-through 50. In this way, an individual wire 41 may be located within slot 54 between edges 53 when cover 44 is pivoted into an open position. Then, when cover 44 is pivoted into a closed position, a rib 72 is configured to move down in between edges 53 and push individual wire 41 down thereby firmly securing individual wire 41 to the externally exposed portion 51 of pass-through 50.

In one embodiment, edges 53 are appropriately configured such that when rib 72 forces wire 41 down between edges 53, insulation around individual wire 41 will be displaced thereby creating electrical connection between individual wire 41 and pass-through 50. This can obviate the need for an installer to provide insulation displacement or "wire stripping" of each individual wire 41 before it is placed between edges 53 of externally exposed portion 51 of pass-through 50.

For example, when a nonmetallic-sheathed cable is used for electrical conductor 40, the main outer sheath is removed revealing three, four or more individual wires 41, each of which is provided with its own individual insulation. This individual insulation can then be left in place, and the closing of cover 44 "automatically" performs the insulation displacement. This not only saves time, but also error in that operators performing insulation displacement on each individual wire can accidentally nick the wire making it vulnerable to breakage. In further embodiments, teeth or other rough features may be added to, or even replace, edges 53 in order to facilitate effective insulation displacement from individual wires 41.

In one embodiment, as cover 44 is closed against body 12 of electrical enclosure 10, snap-down ends 74 are also provided on cover 44 to help secure cover 44 in a closed position against body 12. A catch, or series of indents 47 (illustrated for example in FIG. 2) are then configured in each of first through fourth outer ports 32-38 so that they engage snap-down ends 74. In one case, snap-down ends 74 are tapered so that they easily slide past the indents 47 in ports 32-38 as cover 44 is closed, but then do not easily slide past when cover 44 is opened. In this way, snap-down ends 74 help prevent cover 44 from easily opening.

In one case, opening 76 in cover 44 is configured to snuggly engage electrical conductor 40. In one embodiment, opening 76 is configured to match an oval-shaped conductor so that no space is left between opening 76, electrical conductor 40, and back side of electrical enclosure 10 when cover 44 is closed. In other cases, since conductor 40 can come in a variety of shapes, there is some space left between the cover 44 and conductor 40. In one embodiment, closing cover 44 against electrical conductor 40 provides strain relief against pulling on electrical conductor 40. In one embodiment, cover 44 sufficiently engages electrical conductor 40 and enclosure 10 so that it complies with applicable fire retardant standards.

Figure 7A:
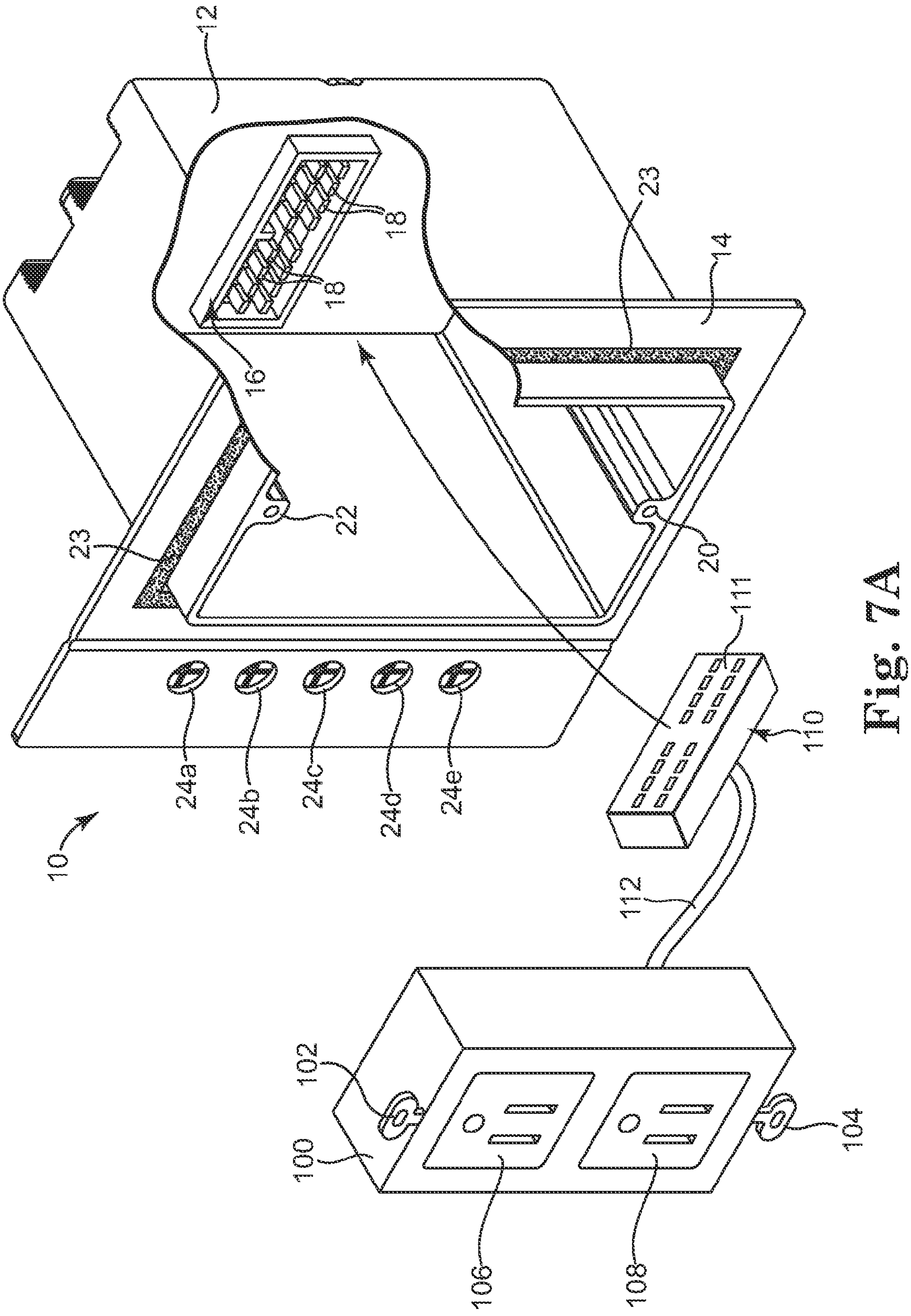
FIG. 7A illustrates an exploded view of an electrical enclosure with a junction device in accordance with one embodiment of the present invention.

FIG. 7A illustrates electrical enclosure 10 with a junction device 100 in accordance with one embodiment of the present invention. In one example, junction device 100 is a receptacle having first and second receptacle ports 106 and 108. Junction device 100 further includes first and second attachment openings 102 and 104, which can be used to secure junction device 100 to electrical enclosure 10, such as via screws secured into first and second connection points 20 and 22.

In one embodiment, junction device 100 is configured with modular device 110, which is electrically coupled to junction device 100 with device connector 112. In one embodiment, modular device 110 is specifically configured to fit uniquely into inner junction 16. For example, in one case, there are four internally exposed portions 18 of pass-throughs 50 within each of first through fourth sections 62-68 of inner junction 16. As such, modular device 110 is configured in that case to have 16 slot contacts in its face 111 to receive each of the 16 internally exposed portions 18. Circuitry within modular device 110 can then be configured to effectuate various desired connections for appropriately electrically coupling junction device 100 with the various electrical conductors 40 that are coupled to electrical enclosure 10.

In one embodiment, modular device 110 is hard-wired to junction device 100 with device connector 112. As such, modular device 110 need only by plugged into inner junction 16 to complete the electrical connection between junction device 100 and the various electrical conductors 40 coupled to electrical enclosure 10. In another embodiment, device connector 112 can be a "pig-tail" configuration such that individual multiple wires extend from modular device 110. These individual wires must then be electrically coupled to various connection posts provided on junction device 100, in addition to plugging modular device 110 into inner junction 16, in order to complete the electrical connection between junction device 100 and the various electrical conductors 40.

Figure 7B:
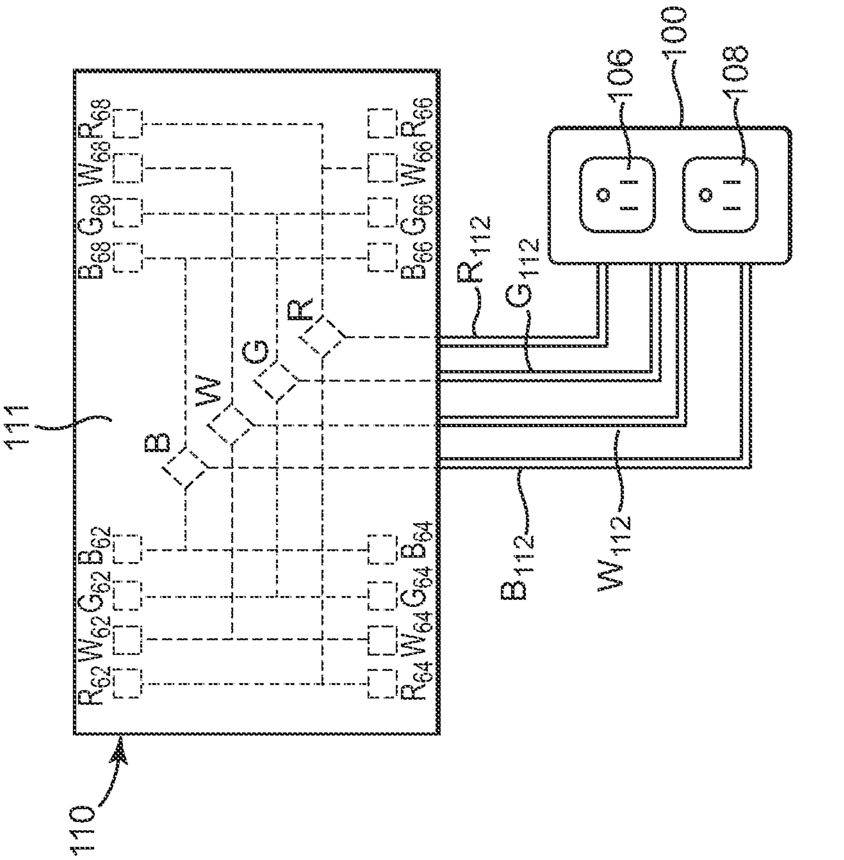
FIG. 7B illustrates an exemplary schematic of electrical connections within a modular device for use with an electrical enclosure in accordance with one embodiment of the present invention.

FIG. 7B illustrates one such exemplary schematic of electrical connections within modular device 110. Modular device 110 is electrically coupled to junction device 100, which is illustrated as a receptacle outlet having two receptacle ports 106 and 108. Modular device 110 includes in its face 111*a* plurality of slot contacts ($R_{62}$, $W_{62}$, $G_{62}$, $B_{62}$, $R_{64}$, $W_{64}$, $G_{64}$, $B_{64}$, $B_{66}$, $G_{66}$, $W_{66}$, $R_{66}$, $B_{68}$, $G_{68}$, $W_{68}$, and $R_{68}$), which are collectively configured to receive each of the 16 internally exposed portions 18 when modular device 110 is coupled to inner junction 16.

In the exemplary embodiment of FIG. 7B, a first set of slot contacts ($R_{62}$, $W_{62}$, $G_{62}$, and $B_{62}$) are coupled to internally exposed portions 18 of pass-throughs 50 within first section 62 of inner junction 16; a second set of slot contacts ($R_{64}$, $W_{64}$, $G_{64}$, and $B_{64}$) are coupled to internally exposed portions 18 of pass-throughs 50 within second section 64 of inner junction 16; a third set of slot contacts ($B_{66}$, $G_{66}$, $W_{66}$, and $R_{66}$) are coupled to internally exposed portions 18 of pass-throughs 50 within third section 66 of inner junction 16; and a fourth set of slot contacts ($B_{68}$, $G_{68}$, $W_{68}$, and $R_{68}$) are coupled to internally exposed portions 18 of pass-throughs 50 within fourth section 68 of inner junction 16. As such, electrical conductor 40 coupled to first through fourth outer ports 32-38 are electrically coupled to first through fourth sets of slot contacts within modular device 110. In one example, electrical conductor 40 coupled to each of the outer ports includes red (R), white (W), ground (G) and black (B) individual wires 41, each of which is coupled to a separate externally exposed portion 51 of pass-through 50. As such, the wire type (R), (W), (G) or (B) that is coupled to first through fourth outer ports 32-38 can be coordinated to the corresponding wire type (R), (W), (G) or (B) of first through fourth set of slot contacts in modular device 110.

In FIG. 7B such exemplary electrical connections are illustrated between the individual wires 41 of electrical conductor 40 and the slot contacts in modular device 110 (via pass-throughs 50). Such connections facilitate a variety of applications for various junction devices. A switched receptacle 100 application is shown in the illustrated example. Within modular device 110, the black (B) connector from each set of slot contacts ($B_{62}$, $B_{64}$, $B_{66}$, and $B_{68}$) is coupled to a main black connector ($B_{112}$) that is coupled through device connector 112 to switched receptacle 100. Similarly, within modular device 110, the ground (G) connector from each set of slot contacts ($G_{62}$, $G_{64}$, $G_{66}$, and $G_{68}$) is coupled to a main ground connector ($G_{112}$) that is coupled through device connector 112 to switched receptacle 100. Within modular device 110, the white (W) connector from three of the set of slot contacts ($W_{62}$, $W_{64}$, and $W_{68}$) is coupled to a main white connector ($W_{112}$) that is coupled through device connector 112 to switched receptacle 100. Finally, within modular device 110, the red (R) connector from three of the set of slot contacts ($R_{62}$, $R_{64}$, and $R_{68}$) and one white connector ($W_{66}$) is coupled to a main red connector ($R_{112}$) that is coupled through device connector 112 to switched receptacle 100.

With this configuration, a standard or a switched receptacle application is configured for junction device 100. When the main red connector ($R_{112}$) is coupled to junction device 100, the first receptacle port 106 is switchable by a switch that is then coupled to outer port 36. When the main red connector ($R_{112}$) is not coupled to junction device 100, the first receptacle port 106 is not switchable and junction device 100 operates as a standard receptacle outlet.

As is evident to one skilled in the art, a variety of modular devices 110 can be configured to support a variety of internal wiring conventions in conjunction with the present invention. Such internal wiring in modular device 110 can accomplish many different wiring connections that are often typically accomplished within the electrical enclosure. For example, in addition to wiring for switched and non-switched receptacles, wiring for light switches, dimmer switches, and a variety of other junction devices may be accomplished within modular device 110.

When such wiring connections are accomplished by bringing electrical conductor 40 inside the box, as is typical in the art, this tends to cause crowding in the box and/or requires very deep boxes that may not be accommodated in some environments, as described previously. As such, internal wiring in modular devices 110 allows a variety of wiring connections and yet avoids crowding within the box.

Figure 8A:
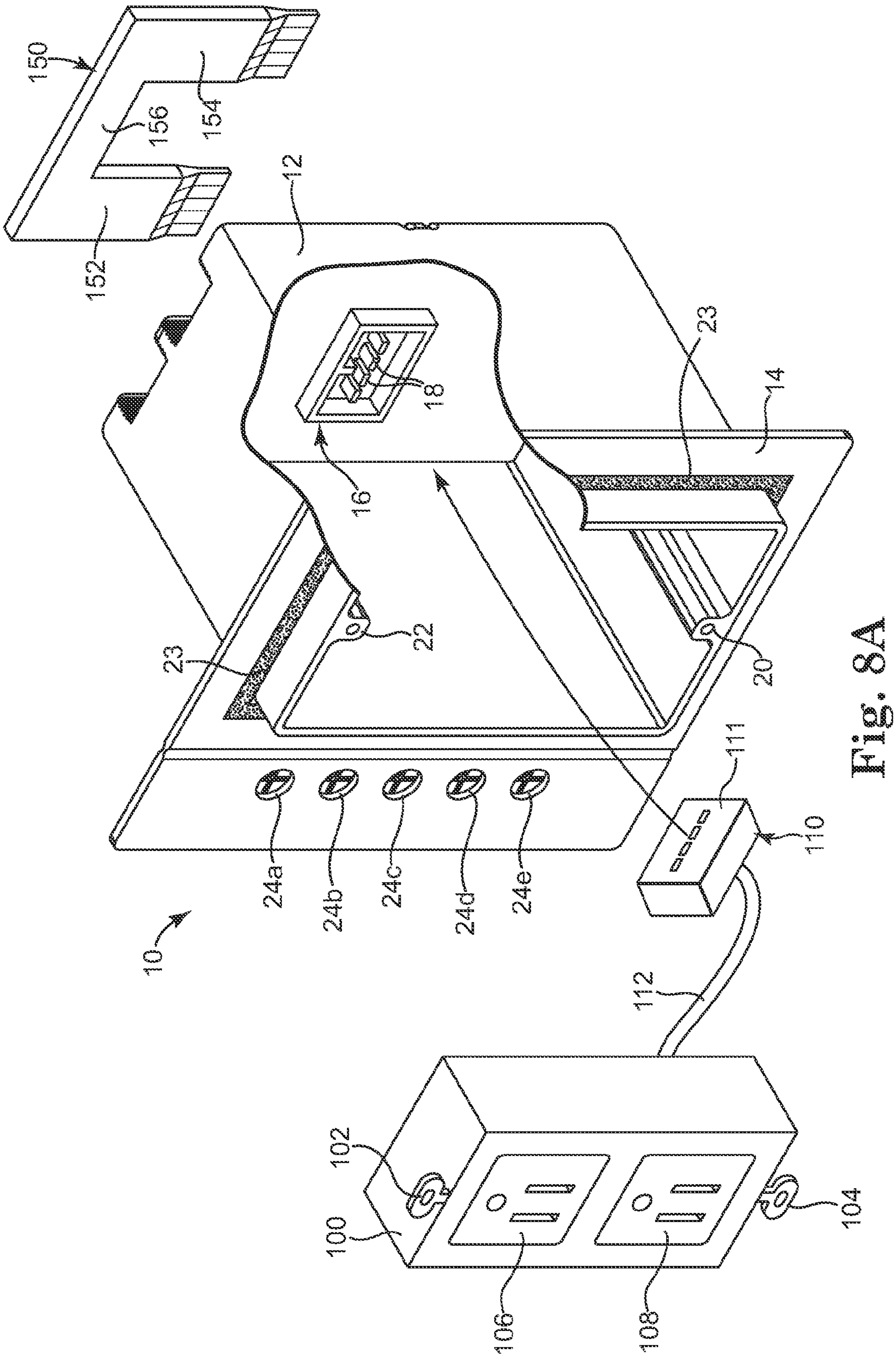
FIG. 8A illustrates an exploded view of an electrical enclosure with a junction device in accordance with one embodiment of the present invention.

Furthermore, internal wiring can also be accomplished in conjunction with pass-throughs 50, thereby also avoiding crowding within the electrical enclosure. FIG. 8A illustrates such an exemplary electrical enclosure 10 with a junction device in accordance with one embodiment of the present invention. In the example, junction device 100 is an receptacle having first and second receptacle ports 106 and 108. Junction device 100 further includes first and second attachment openings 102 and 104, which can be used to secure junction device 100 to electrical enclosure 10, such as via screws secured into first and second connection points 20 and 22.

In one embodiment, junction device 100 is configured with modular device 110, which is electrically coupled to junction device 100 with device connector 112. In one embodiment, modular device 110 is specifically configured to fit uniquely into inner junction 16. For example, in one case, there are a total of four internally exposed portions 18 of pass-throughs 50 within inner junction 16. As such, electrical connections between the individual wires 41 of electrical conductor 40 coupled to outer junction 30 and the four internally exposed portions 18 of pass-throughs 50 within inner junction 16 are embedded within the body 12 of electrical enclosure 10. In this example, modular device 110 is then configured to have only four slot contacts in its face 111 to receive each of the four internally exposed portions 18.

Similar to the embodiment of FIG. 7A, the embodiment illustrated in FIG. 8A shows modular device 110 hard-wired to junction device 100 with device connector 112. As such, modular device 110 need only be plugged into inner junction 16 to complete the electrical connection between junction device 100 and the various electrical conductors 40 coupled to electrical enclosure 10. In another embodiment, device connector 112 can be a "pig-tail" configuration such that individual multiple wires extend from modular device 110. These individual wires must then be electrically coupled to various connection posts provided on junction device 100, in addition to plugging modular device 110 into inner junction 16, in order to complete the electrical connection between junction device 100 and the various electrical conductors 40.

Figure 8B:
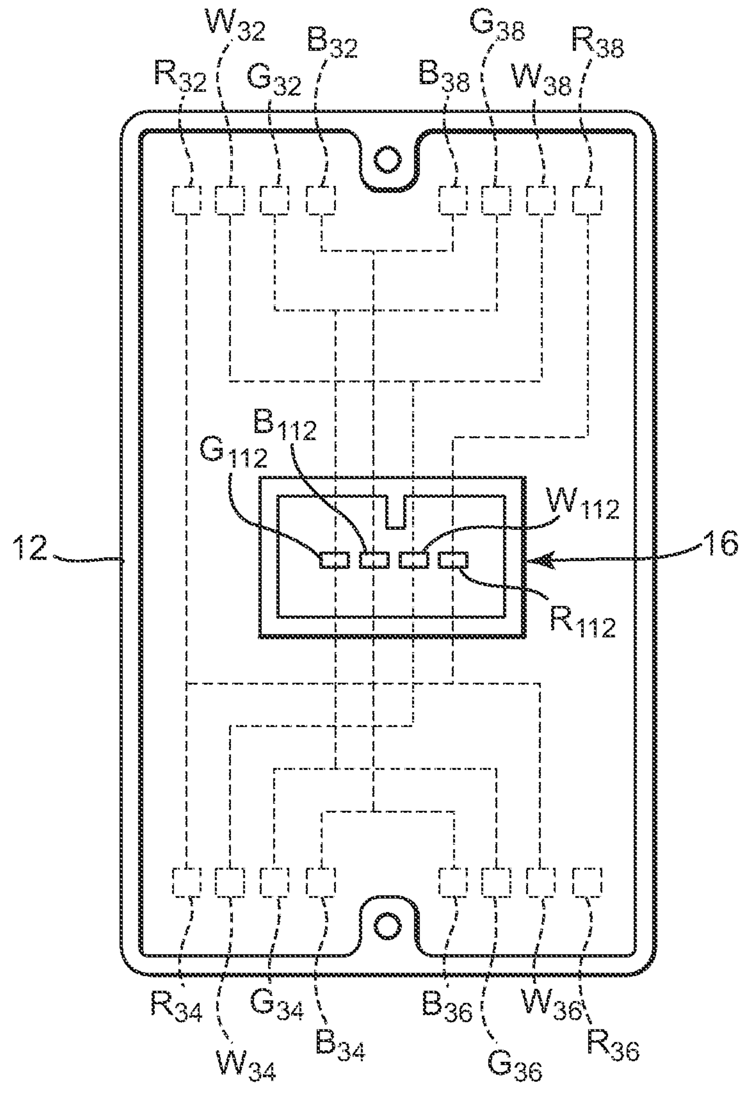
FIG. 8B illustrates an exemplary schematic of electrical connections within an electrical enclosure in accordance with one embodiment of the present invention.

FIG. 8B illustrates an exemplary schematic of electrical connections within an electrical enclosure 10 in accordance with one embodiment of the present invention. In the illustration, body 12 of electrical enclosure 10 has been ghosted so that the electrical connections within body 12 are visible. These electrical connections are accomplished with pass-throughs 50 that not only electrically couple various outer ports with inner junction 16, but also electrically couple some of the outer ports, or portions thereof.

More specifically, in one example electrical conductor 40 that is coupled to each of the outer ports includes red (R), white (W), ground (G) and black (B) individual wires 41. More specifically, electrical conductor 40 coupled to first outer port 32 includes a red wire $R_{32}$, a white wire $W_{32}$, a ground wire $G_{32}$, and a black wire $B_{32}$; electrical conductor 40 coupled to second outer port 34 includes a red wire $R_{34}$, a white wire $W_{34}$, a ground wire $G_{34}$, and a black wire $B_{34}$; electrical conductor 40 coupled to third outer port 36 includes a black wire $B_{36}$, a ground wire $G_{36}$, a white wire $W_{36}$, and red wire $R_{36}$; and electrical conductor 40 coupled to fourth outer port 38 includes a black wire $B_{38}$, a ground wire $G_{38}$, a white wire $W_{38}$, and red wire $R_{38}$. Each of these individual wires 41 is coupled to a separate externally exposed portion 51 of pass-through 50 as described above. These pass-throughs 50 are then internally connected within body 12 in a manner to effectuate various desired connections for appropriately electrically coupling junction device 100 with the various electrical conductors 40 that are coupled to electrical enclosure 10. Ultimately these pass-throughs terminate in one of four main internally exposed portions 18 ($G_{112}$, $B_{112}$, $W_{112}$, $R_{112}$).

With this configuration, a standard or a switched receptacle application is configured for junction device 100. When the main red connector ($R_{112}$) is coupled to junction device 100, the first receptacle port 106 is switchable by a switch that is coupled to outer port 36. When the main red connector ($R_{112}$) is not coupled to junction device 100, the first receptacle port 106 is not switchable and operates as a standard receptacle outlet.

As with the example illustrated in FIGS. 7A and 7B, the plurality of pass-throughs 50 embedded within body 12 can be configured to support a variety of internal wiring conventions in conjunction with the present invention. Such internal wiring in body 12 can accomplish many different wiring connections that are often typically accomplished within the electrical enclosure. For example, in addition to wiring for switched and non-switched receptacles, wiring for light switches, dimmer switches, and a variety of other junction devices may be accomplished within body 12.

Furthermore, one skilled in the art will see that combinations of the various examples can be used in accordance with the present invention. For example, some internal wiring can be accomplished within body 12 by coupling some of the pass-throughs 50 as illustrated in FIG. 8B, and some can be accomplished within modular device 110 as illustrated in FIG. 7B. Various other combinations are possible, and of course, no internal wiring is necessary in accordance with some embodiments of the invention.

FIG. 8A also illustrates another embodiment of the invention that uses clip coupler 150. Clip coupler 150 includes first and second legs 152 and 154 and connector 156. With clip coupler 150, it is possible to quickly electrically couple two electrical enclosures 10, by plugging a first leg 152 into an outer port (32, 34, 36, or 38) of one electrical enclosure 10 and plugging a second leg 154 into an outer port (32, 34, 36, or 38) of another electrical enclosure 10. This can accomplish a quick connect of two electrical enclosures 10 to create a "double gang." Other ways to accomplish this double gang include simply using electrical conductor 40 coupled between outer ports of two electrical enclosures 10.

One skilled in that art can see that it is also possible to create an embedded connection between two electrical enclosures 10 by using a pass-through 50 connected between them. In one example, a pass-through connection could be "fusible." As such, a user could break the electrical connection between two enclosures or leave it intact depending on the particular application. For example, such a pass-though connection could be an easy way to connect "ground" or "hot" wires between enclosures.

In addition, enclosure 10 can be constructed with multiple openings and multiple inner and outer ports 16 and 30 so that multiple junction devices 100 can be mounted to a single enclosure 10. These multiple-opening box configurations are sometimes referred to as "multi-gang," such as "double-gang boxes" or "triple-gang boxes." In such a multi-gang box configuration, certain pass-throughs 50 can couple between multiple inner and outer ports 16 and 30 so that some electrical connections can be made between junction devices coupled within a single enclosure 10. Some of these connections can also be fusable.

Figure 9:
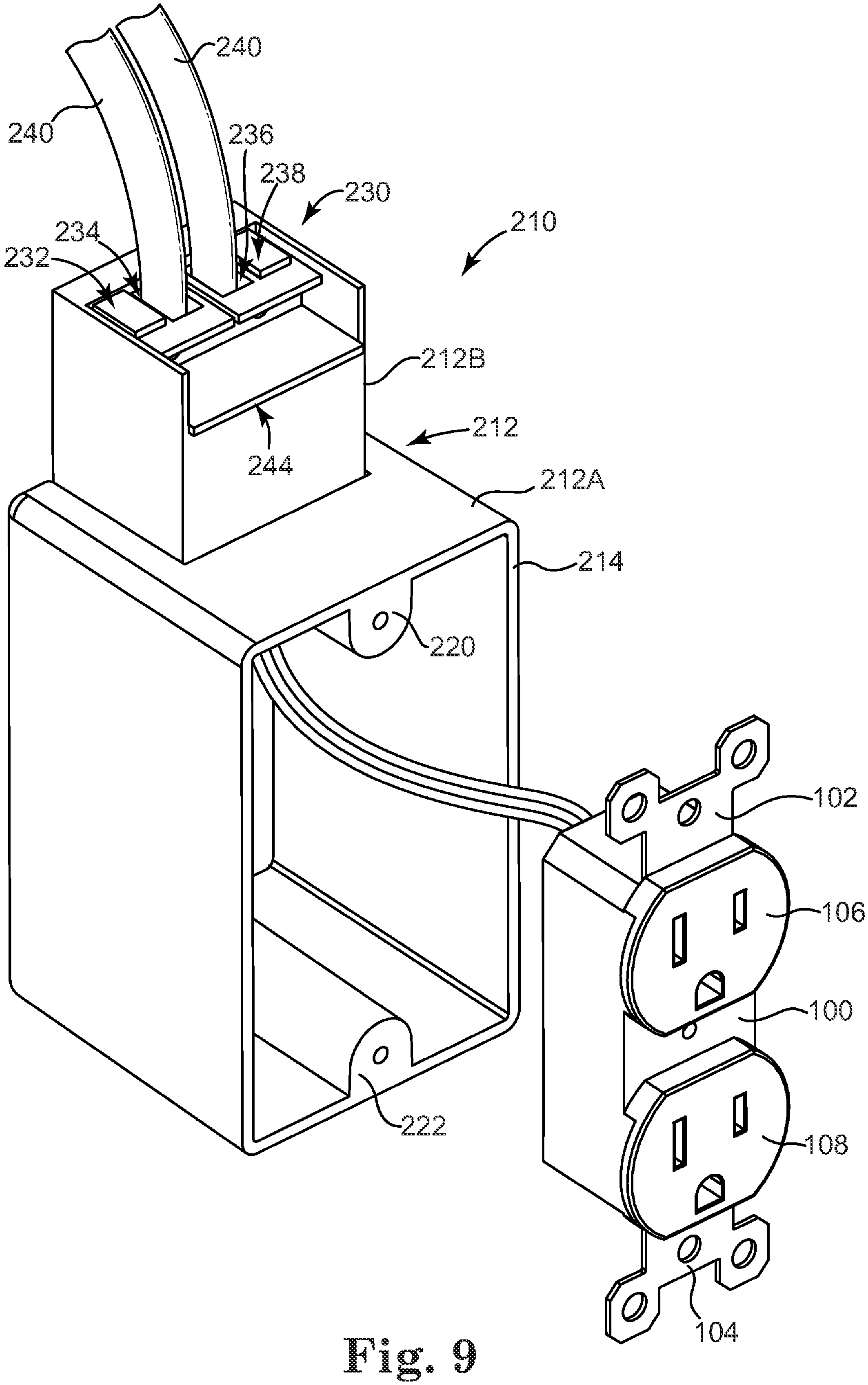
FIG. 9 illustrates a front perspective view of an electrical enclosure in accordance with one embodiment of the present invention.

FIG. 9 illustrates electrical enclosure 210 in accordance with one embodiment of the present invention. In one embodiment, electrical enclosure 210, like electrical enclosure 10 described above, is configured to be connectable within a wall, ceiling, or floor of a building structure. Electrical conductors or wiring may then be routed from a circuit breaker panel within the building structure to electrical enclosure 210, which in one case is configured as a junction box. In one case, the circuit breaker panel is configured to distribute high-voltage to the various junction boxes, such as 120-240 volts. In other cases, high-voltage can be various levels above 50 volts. Various junction devices, such as receptacle outlets, switched receptacles, light switches, dimmer switches, fans, lights, fixtures and electrical appliances, can be connected to electrical enclosure 210 and are thereby coupled to the wires from the circuit breaker panel delivering the high voltage.

In one embodiment, electrical enclosure 210 includes body 212 and face 214. In one embodiment, body 212 includes a first part 212A and a second part 212B. In operation of electrical enclosure 210, first part 212A and second part 212B are coupled together to form body 212.

In one case, body 212 includes first and second connection points 220 and 222 into which various junction devices can be mechanically secured. For example, junction device 100 is a receptacle having first and second receptacle ports 106 and 108 and first and second attachment openings 102 and 104, which can be used to secure junction device 100 to electrical enclosure 210, such as via screws secured into first and second connection points 220 and 222.

Electrical enclosure 210 also includes an inner junction 216 (illustrated in FIG. 12B) on an inner side of electrical enclosure 210, as well as an outer junction 230 on an outer side of electrical enclosure 210. In one embodiment of the invention, electrical conductors 240 or wiring from the circuit breaker panel of the building is brought to the outer junction 230 on the outer side of electrical enclosure 210 and secured thereto using cover 244. Electrical junction devices 100, such as switches and receptacles are then electrically coupled to inner junction 216 on the inner side of electrical enclosure 210.

In one embodiment, an electrical connection between inner junction 216 and outer junction 230 is provided within body 212 of electrical enclosure 210 to complete the electrical connection between inner and outer junctions 216 and 230. In one embodiment, pass-throughs (as discussed and illustrated above, for example, in FIGS. 3 and 5 and associated description) are at least partially contained within body 212 of electrical enclosure 210 to complete the electrical connection between inner and outer junctions 216 and 230.

Electrical enclosure 210 includes outer junction 230 having first, second, third, and fourth outer ports 232, 234, 236, and 238. Electrical conductors 240 from a building circuit breaker panel or from another electrical box can be brought to and connected at any of first through fourth ports 232-238. These electrical connections or ports are then electrically coupled to inner junction 216 via pass-through, as discussed more fully above.

Figure 10:
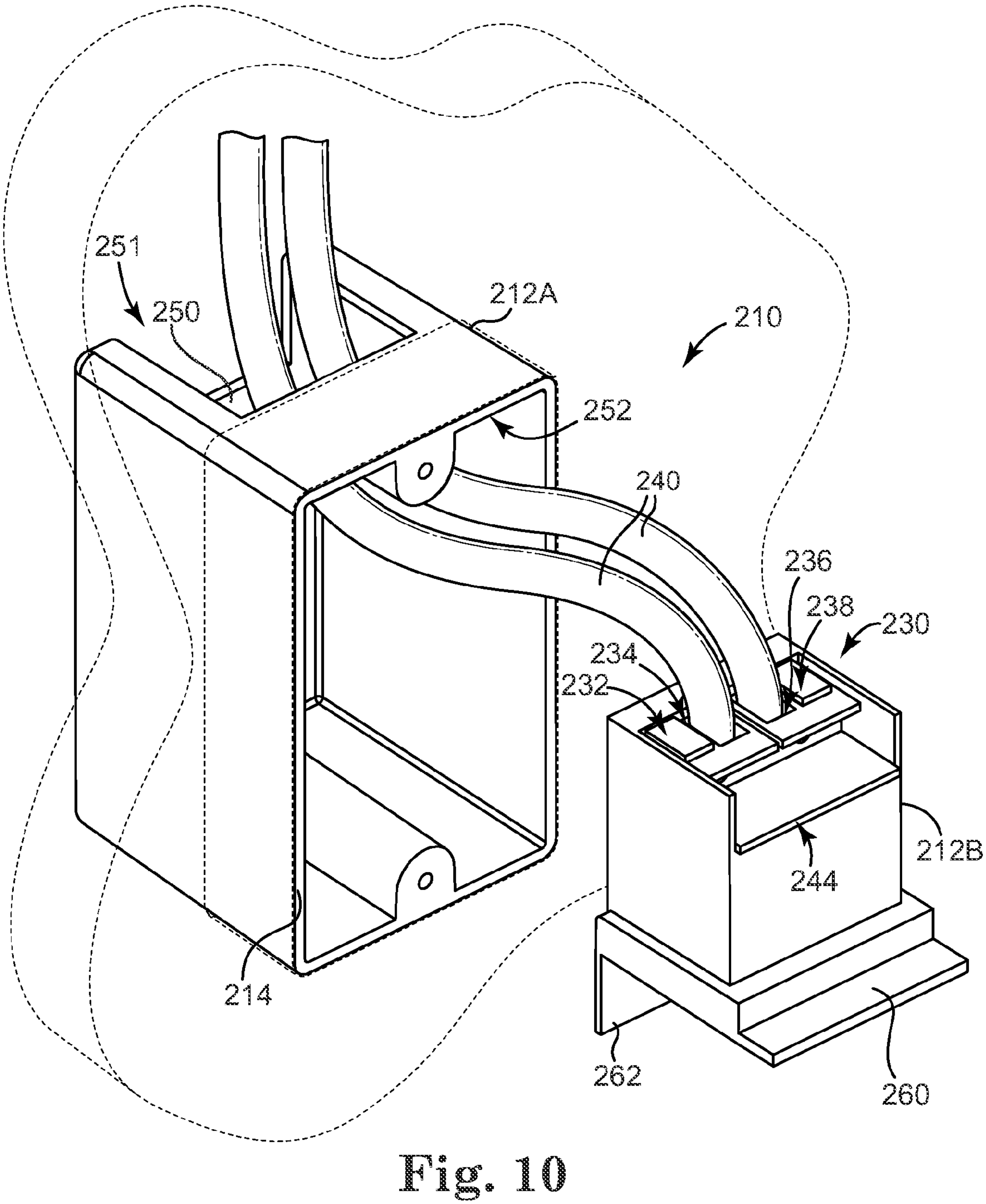
FIG. 10 illustrates a partially exploded view of an electrical enclosure in accordance with one embodiment of the present invention.

FIG. 10 illustrates first part 212A and second part 212B de-coupled to provide access to outer junction 230. In one embodiment, once electrical enclosure 210 is installed in an application, such as a building or home, finishing materials may surround enclosure 210 such that only its inside is accessible through the opening defined by face 214. For example, sheetrock (a portion shown in dotted lines in FIG. 10) can be installed around enclosure 210 sealing around its outer side such that only the inner side of enclosure 210 is accessible though its face 214. As such, the outer side of enclosure 210 is inaccessible without breaking through the sheet rock. If access to outer junction 230 is desired after enclosure 210 is sealed off with finishing materials, however, this can be accomplished in one embodiment by snapping out second part 212B through first part 212A.

Figure 11A:
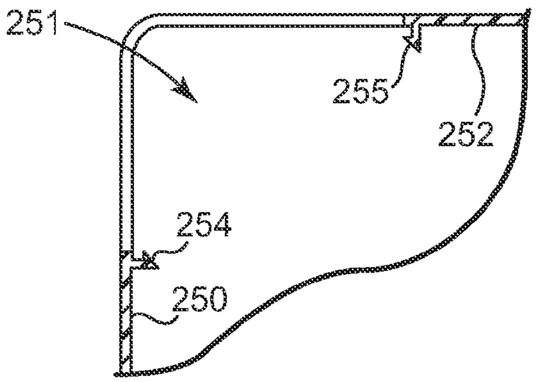
FIG. 11A illustrates a partially cross-sectional view of a portion of an electrical enclosure in accordance with one embodiment of the present invention.
Figure 11B:
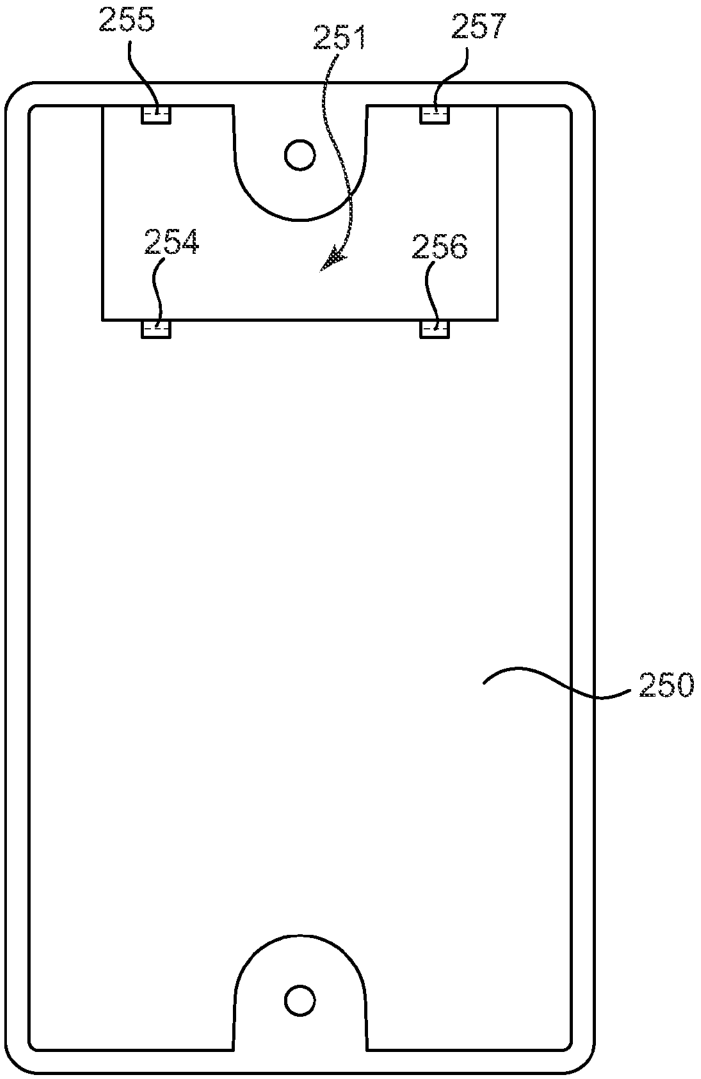
FIG. 11B illustrates front view of a portion of an electrical enclosure in accordance with one embodiment of the present invention.

In one embodiment, first part 212A includes a back surface 250 and a top surface 252 (illustrated in the cross-sectional view of FIG. 11A), each of which are provided with latches or mechanisms to releasably secure first part 212A to second part 212B. In one embodiment, first through fourth latches 254-257 are provided on first part 212A, as illustrated in FIGS. 11A and 11B. First and third latches 254 and 256 project out from back surface 250 and second and fourth latches 255 and 257 project down from top surface 252. First and third latches 254 and 256 are configured to engage lip 262 (illustrated in FIG. 10) on second part 212B and second and fourth latches 255 and 257 are configured to engage ledge 260 (also illustrated in FIG. 10) on second part 212B.

Each of latches 254-257 are movable such that they may be pulled back from engaging lip 262 and ledge 260 so that second part 212B can be released from first part 212A and pulled though the opening defined by face 214 as illustrated in FIG. 10. In this way, outer junction 230 is accessible even in instances where enclosure 210 has been fully installed with finishing material otherwise completely closing off access to its outer surface.

Once outer junction 230 is successfully accessed, second part 212B can be readily inserted back into first part 212A such that body 212 is again formed and ready to function as an electrical enclosure. In some embodiments, a gasket or foam seal can be placed between the portions of first part 212A and second part 212B that overlap so that second part 212B snapped into first part 212A it is sealed tightly without openings on the outer side of enclosure 210.

While second part 212B is removed from first part 212A, a relatively large access opening 251 is left in first part 212A. This opening 251 prevents first part 212A from functioning as a junction box without second part 212*b* secured thereto. Opening 251 is useful, however, in some embodiments for pulling additional electrical conductors 240 into enclosure 210. For example, once electrical enclosure 210 is installed in finished wall such that materials surround its outer surface (as partially illustrated with dotted lines in FIG. 10), additional electrical conductors 240 can be introduced into the finished wall and “fished” through opening 251. Because opening 251 is fairly large in size, pulling the additional electrical conductors 240 can be more readily accomplished.

As with embodiments described above each of first through fourth outer ports 232-238 is configured to receive an electrical conductor 240. For example, in FIG. 12A electrical conductors 240 are each illustrated having individual wires 241. Each of ports 232-238 are then configured with individual slots 245 to receive each individual wire. In the illustration, only slots 245 of fourth port 238 are labeled for ease of illustration, but each of first through fourth outer ports 232-238 may be configured to receive individual wires 241 from within a corresponding electrical conductor 240. Each slot 245 is configured with a conductive pass-through such that each of the wires 241 will contact a pass-through when inserted therein, as described above with previous embodiments.

Once wires 241 of electrical conductors 240 are inserted into slots 245 of outer ports 232-238, cover 244 is inserted over outer junction 230 in order to secure electrical conductors 240 to body 212, thereby providing additional strain relief to the electrical connection. In addition, wire cover 244 encloses outer junction 230 thereby providing fire protection in the event an electrical connection fails and heat build-up ensues. For example, cover 244 can be sufficient to meet applicable fire retardant standards, providing a seal from the combination of the surfaces of cover 244 and body 212. In one embodiment, cover 244 is secured to second part 212B via screws or similar fasteners.

In one embodiment, cover 244 includes caps 232*a*-238*a* corresponding to ports 232-238. Where an electrical conductor 240 is attached at any of outer ports 232-238, the corresponding cap 232*a*-238*a* is removed so that electrical conductor 240 can pass through cover 244. Where an electrical conductor 240 is not attached at any of outer ports 232-238, the corresponding cap 232*a*-238*a* is left in place so that there is no opening in wire cover 244, such that it provides enclosure and fire protection in the event an electrical connection failure.

Figure 12A:
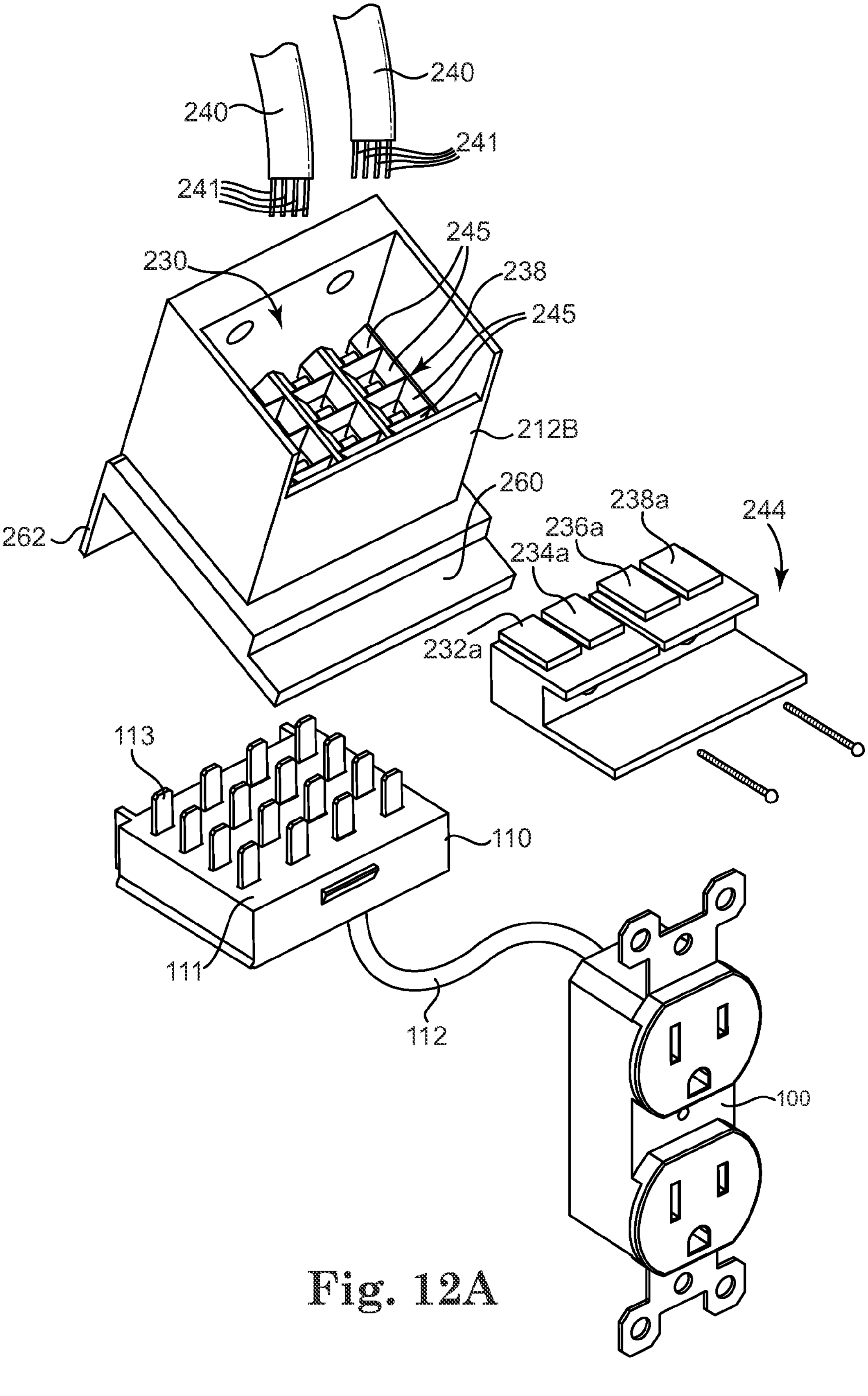
FIG. 12A illustrates a portion of an electrical enclosure in accordance with one embodiment of the present invention.
Figure 12B:
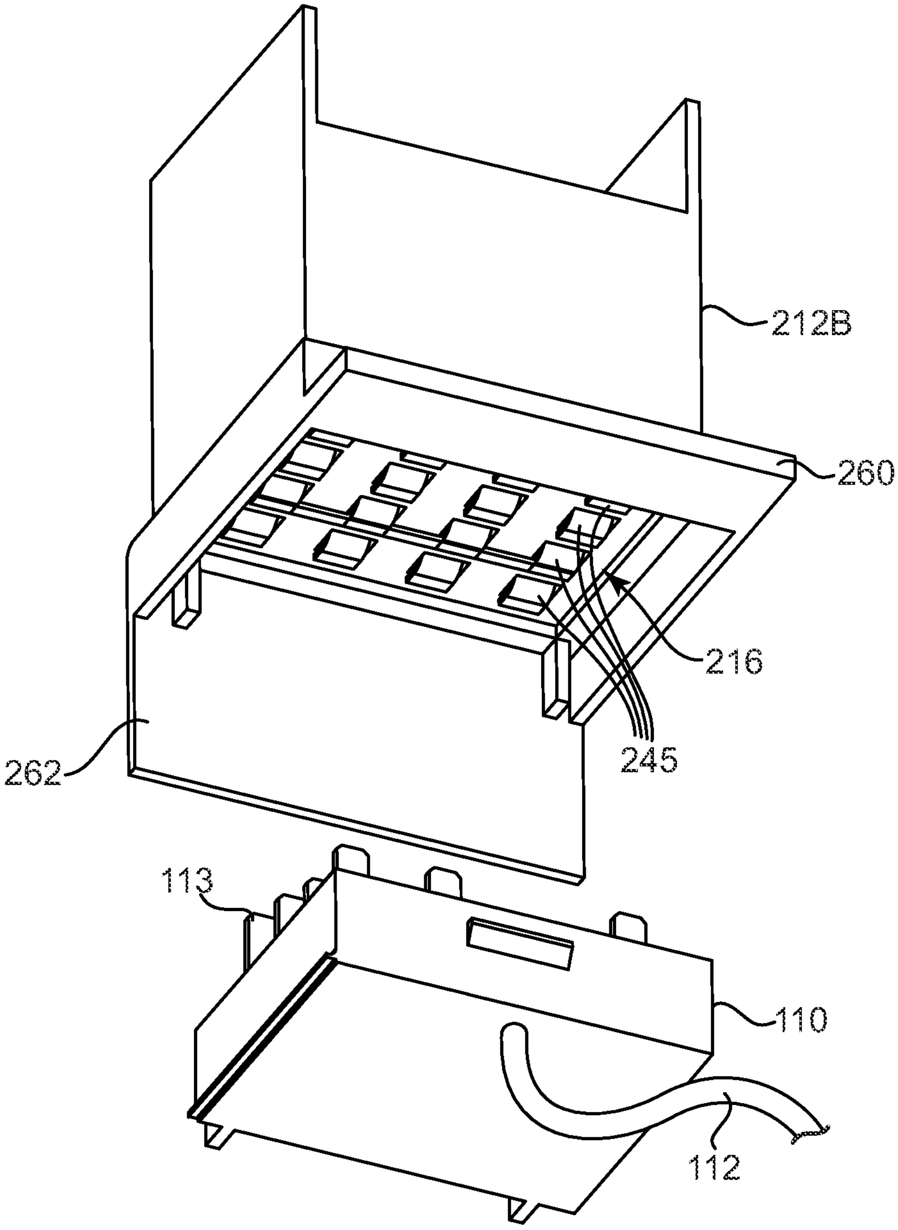
FIG. 12B illustrates a portion of an electrical enclosure in accordance with one embodiment of the present invention.

As with previous-described embodiments, electrical enclosure 210 is configured to interface with a junction device 100 in accordance with one embodiment, also illustrated in FIGS. 9 and 12A. In one example, junction device 100 is a receptacle having first and second receptacle ports 106 and 108 and first and second attachment openings 102 and 104, which can be used to secure junction device 100 to electrical enclosure 210, such as via screws secured into first and second connection points 220 and 222 (FIG. 9).

In one embodiment, junction device 100 is configured with modular device 110, which is electrically coupled to junction device 100 with device connector 112. In one embodiment, modular device 110 is specifically configured to fit uniquely into inner junction 216.

For example, in one embodiment modular device 110 is configured with a plurality of tines 113 that extend out from a face 111 of device 110. Tines 113 are configured to be inserted into corresponding slots 245 of inner junction 216. Slots 245 extend between inner and outer junctions 216 and 230 and each contain a conductive pass-through. Each pass-through is then configured to electrically connect to an individual wire 241 inserted into slot 245 at outer junction 230 and configured to electrically connect to an individual tine 113 at inner junction 216. Such conductive pass-throughs are illustrated in detail, for example, in previously discussed embodiments.

Circuitry within modular device 110 (as previously discussed with earlier embodiments) can then be configured to effectuate various desired connections for appropriately electrically coupling junction device 100 with the various electrical conductors 240 that are coupled to electrical enclosure 210.

Figure 13:
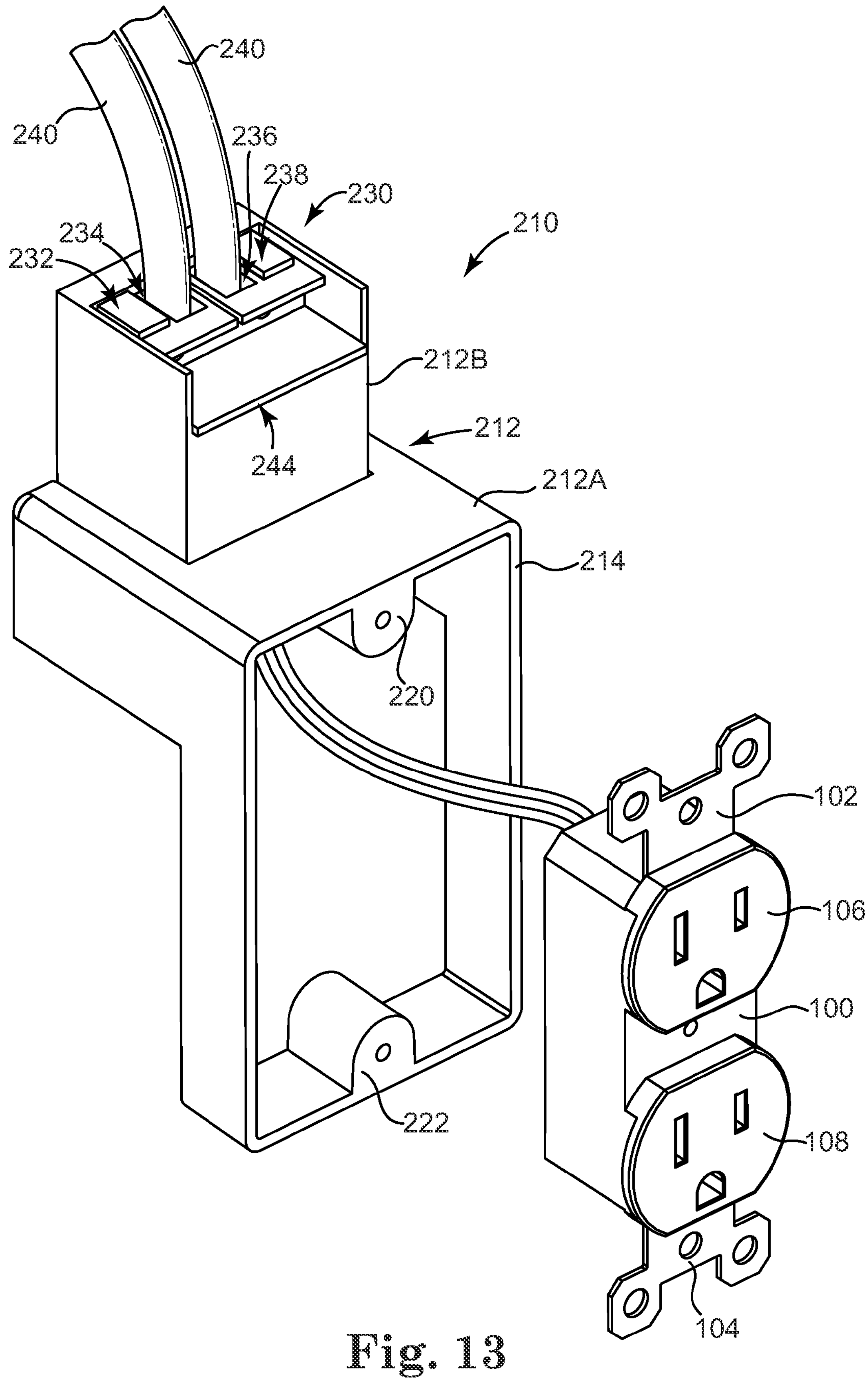
FIG. 13 illustrates a front perspective view of an electrical enclosure in accordance with one embodiment of the present invention.

FIG. 13 illustrates electrical enclosure 210 in accordance with one embodiment of the present invention. In one embodiment, electrical enclosure 210, like previously-described electrical enclosures, is configured to be connectable within a wall, ceiling, or floor of a building structure. Electrical conductors or wiring may then be routed from a circuit breaker panel within the building structure to electrical enclosure 210, which in one case is configured as a junction box. In one case, the circuit breaker panel is configured to distribute high-voltage to the various junction boxes, such as 120-240 volts. In other cases, high-voltage can be various levels above 50 volts. Various junction devices, such as receptacle outlets, switched receptacles, light switches, dimmer switches, fans, lights, fixtures and electrical appliances, can be connected to electrical enclosure 210 and are thereby coupled to the wires from the circuit breaker panel delivering the high voltage.

In one embodiment, electrical enclosure 210 includes body 212 and face 214. In one embodiment, body 212 includes a first part 212A and a second part 212B. In operation of electrical enclosure 210, first part 212A and second part 212B are coupled together to form body 212, as previously described above in association with FIG. 9.

In one example, while second part 212B is substantially the same as second part 212B described above, first part 212A is slightly modified from the above described. In the illustration of FIG. 13, first part 212A has an open back (that is, it has no back surface 250 as in FIG. 9). Since second part 212B is closed over the conductors 240, by the combination of the surfaces of cover 244 and body 212, whether or not first part 212A of body 212 is entirely enclosed may not be required in some instances.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof. For example, electrical enclosure 10 is illustrated in a relatively box-like configuration, such as a typically-shaped junction box. One skilled in the art will understand that the invention also embodies various other polygon-shaped configurations, such as octagonal, and could also be round or other various shapes, all consistent with the present invention.

What is claimed is:

1. An electrical enclosure configured for attachment in a building structure, the enclosure comprising:

a first part and a second part together forming a body;

the body having an inner surface and an outer surface that are separated on opposing surfaces of the body;

an outer junction adjacent the outer surface of the body;

an inner junction adjacent the inner surface of the body; and conductive pass-throughs that are at least partially contained within the body for electrically coupling the inner and outer junctions;

wherein an external conductor routing high-voltage from a high-voltage source in the building structure is coupled to the outer junction and mechanically fixed thereto and enclosed sufficiently to provide fire protection and prevent degradation, and such that no portion of the external conductor passes through the body into the inner surface; and wherein the second part is removable through the first part thereby providing access to the outer junction through the first part even when the electrical enclosure is installed in the building structure and without removing any part of the building.

2. The electrical enclosure of claim 1, wherein the second part is removable through the first part and through the inner surface of the body thereby providing access to the outer junction through the first part.

3. The electrical enclosure of claim 1, wherein the outer junction further comprises a plurality of outer ports configured to couple with a plurality of multi-wire electrical conductors, and such that a multi-wire electrical conductor from the plurality of multi-wire electrical conductors coupled to an outer port from the plurality of outer ports is also electrically coupled to the inner junction via the pass-throughs.

4. The electrical enclosure of claim 3, wherein the outer junction and the plurality of outer ports are configured in the second part, such that the outer junction and the plurality of ports are accessible when the second part is removed through the first part even when the electrical enclosure is fully installed in a finished surface of the building structure without removing building finish materials.

5. The electrical enclosure of claim 4, wherein the inner junction is further configured to couple with a modular device of a junction device, the modular device being configured internally to electrically couple at least some of the plurality of multi-wire electrical conductors that are connected to the plurality of outer ports.

6. The electrical enclosure of claim 3, wherein the multi-wire electrical conductors each comprise individual conductive wires, and wherein each of the individual conductive wires is coupled to a separate pass-through that is electrically coupled to the inner junction.

7. The electrical enclosure of claim 6, wherein each of the plurality of outer ports is configured with slots to receive the individual conductive wires of the electrical conductors.

8. The electrical enclosure of claim 5, wherein the junction device is one of a group comprising a receptacle outlet, a switched receptacle, a switch, a dimmer switch, a fan, a light, a fixture and an electrical appliance.

9. An electrical enclosure comprising:

a first part and a second part together forming a body;

the body having a first side and a second side that are separated from each other;

a first junction adjacent the first side of the body;

a second junction adjacent the second side of the body; and at least one conductive pass-through that is at least partially contained within the body such that the at least one conductive pass-through electrically couples the first and second junctions;

wherein the second junction is enclosed by a second enclosure that is configured to surround the second junction to prevent degradation of a coupled external high-voltage conductor and to provide fire protection; and wherein the second part is removable from the first part such that the second part can be removed through the first part providing access to the second junction even when the electrical enclosure is fully installed in a building and without removing any part of the building.

10. The electrical enclosure of claim 9, wherein the second junction further comprises outer ports configured to couple with external high-voltage multi-wire electrical conductors, and such that the multi-wire electrical conductors coupled to the outer ports are also electrically coupled to the first junction via pass-throughs.

11. The electrical enclosure of claim 10, wherein the second junction and the outer ports are configured in the second part, such that the second junction and the outer ports are accessible when the second part is removed through the first part.

12. The electrical enclosure of claim 9, wherein, apart from accommodating the conductive pass-through, the electrical enclosure is characterized by the absence of an opening extending between the inner and outer junctions.

13. The electrical enclosure of claim 9, wherein the external conductor comprises a multiple-wire electrical conductor and wherein the second junction is configured with slots for receiving the multiple-wire electrical conductor.

14. A method for installing an electrical enclosure having an outer side and an inner side, the method comprising:

attaching the electrical enclosure in a building structure such that the outer side of the enclosure is sealed off behind a surface of the building structure;

temporarily removing a first portion of the electrical enclosure through a second portion of the electrical enclosure thereby providing access to an outer junction on the outer side of the electrical enclosure and without removing any part of the building;

attaching an external conductor routing high-voltage from a high-voltage source in the building structure to the outer junction;

reassembling the first portion of the electrical enclosure back into the second portion of the electrical enclosure;

electrically connecting a junction device to an inner junction on the inner side of the electrical enclosure; and providing a conductive path between the inner and outer junctions;

wherein the method of installing the electrical enclosure is characterized by the absence of having the external conductor inside the electrical enclosure and by coupling the external conductor directly to the outer junction on the outer surface of the enclosure.

15. The method of claim 14 further comprising attaching a plurality of external high-voltage electrical conductors to a plurality of outer ports at the outer junction.

16. An enclosure comprising:

a body having a first side and a second side;

a first junction adjacent the first side of the body;

a second junction adjacent the second side of the body; and a conductive pass-through that is at least partially contained within the body, the pass-through having a first and a second end;

wherein the first end of the pass-through extends adjacent to the first junction and is configured for coupling with a junction device;

wherein the second end of the pass-through extends adjacent to the second junction and is configured for directly coupling with an external conductor that is routing high-voltage from a high-voltage source in a building structure, such that no portion of the external conductor passes into the first side when coupled to the second junction; and wherein the body has first and second parts configured such that the second part is removable through the first part thereby providing access to the second junction even after the electrical junction is fully installed in the building structure and without removing any part of the building.

17. The enclosure of claim 16 further comprising a covering coupled against the second side thereby enclosing the external conductor at the second junction, wherein the covering is configured to surround the external conductor such that the combination of the covering and the second side provides strain relief against any pulling on the external conductor.

18. A removable part for an electrical enclosure, the removable part comprising:

an inner surface and an outer surface that are separated on opposing surfaces of the removable part;

an outer junction adjacent the outer surface of the removable part;

an inner junction adjacent the inner surface of the removable part; and conductive pass-throughs that are at least partially contained within the removable part for electrically coupling the inner and outer junctions;

wherein an external conductor routing high-voltage from a high-voltage source in a building structure is coupled to the outer junction and mechanically fixed thereto and enclosed sufficiently at the outer junction to provide fire protection and prevent degradation, and such that no portion of the external conductor passes through the removable part into the inner surface; and wherein the removable part is alternatively attachable to and removable through a base part such that when the removable part and the base part are attached they form a unitary electrical enclosure and such that when the removable part is removed from the base part it can be removed through the base part thereby providing access to the outer junction through the base part even when the electrical enclosure is installed in the building structure, and without removing any part of the building.

* * * * *